US012589979B2

(12) United States Patent
Eaton et al.

(10) Patent No.:  US 12,589,979 B2
(45) Date of Patent:    Mar. 31, 2026

(54) FORKLIFT CAB ENCLOSURE SYSTEM

(71) Applicant: LDS Holdings LLC, Madison, IN (US)

(72) Inventors: Justin L. Eaton, Madison, IN (US);
Justin Vanover, Holton, IN (US)

(73) Assignee: LDS Holdings LLC, Madison, IN (US)

( * ) Notice: Subject to any disclaimer, the term of this patent is extended or adjusted under 35 U.S.C. 154(b) by 0 days.

(21) Appl. No.: 19/005,387

(22) Filed: Dec. 30, 2024

(65) Prior Publication Data

US 2025/0214819 A1    Jul. 3, 2025

Related U.S. Application Data

(60) Provisional application No. 63/616,152, filed on Dec. 29, 2023.

(51) Int. Cl.
B66F 9/075     (2006.01)
B60J 1/00      (2006.01)
B62D 25/04     (2006.01)

(52) U.S. Cl.
CPC ............. B66F 9/0759 (2013.01); B60J 1/004 (2013.01); B62D 25/04 (2013.01)

(58) Field of Classification Search
CPC ......... B66F 9/0759; B60J 1/004; B62D 25/04
See application file for complete search history.

(56) References Cited

U.S. PATENT DOCUMENTS

| | | | |
|---|---|---|---|
| 5,286,081 A | 2/1994 | Martin, Jr. | |
| 6,149,228 A * | 11/2000 | O'Neill | .............. B62D 33/0621 |
| | | | 296/190.08 |
| 6,561,572 B1 * | 5/2003 | Martin, Jr. | ......... B62D 33/0621 |
| | | | 296/190.11 |
| 7,281,753 B2 * | 10/2007 | Curtis, Jr. | .............. B60J 5/0487 |
| | | | 296/146.12 |
| 9,021,764 B2 | 5/2015 | Yoon | |
| 9,481,980 B2 | 11/2016 | Bang | |
| 11,173,967 B2 * | 11/2021 | Collyer | ...................... B60J 1/04 |
| 11,472,268 B1 * | 10/2022 | Vanover | .................... B60J 1/06 |

(Continued)

FOREIGN PATENT DOCUMENTS

| | | |
|---|---|---|
| GB | 2441522 A | 3/2008 |
| JP | H0648065 Y2 | 12/1994 |
| KR | 1020120007344 A | 1/2012 |

(Continued)

OTHER PUBLICATIONS

Machine translation of JPH0648065Y2 by PatDocs PDF on May 15, 2023 (pp. 10).

(Continued)

*Primary Examiner* — Paul N Dickson
*Assistant Examiner* — Tiffany L Webb
(74) *Attorney, Agent, or Firm* — Woodard, Emhardt, Henry, Reeves & Wagner, LLP

(57)     ABSTRACT

An enclosure for an overhead guard that includes a door mounting post clamped to one vertical post, a door panel mounted on the door mounting post and clamped to a second vertical post and a front windshield clamped to the second vertical post and a third vertical post, where the front windshield and the door panel do not share any attachment points and are not coupled to each other and where both the front windshield and door panel can be coupled to the overhead guard without modifying the overhead guard.

19 Claims, 30 Drawing Sheets

(56) References Cited

U.S. PATENT DOCUMENTS

| | | | |
|---|---|---|---|
| 11,629,038 B2 * | 4/2023 | Kim ...................... | B66F 9/0759 187/222 |
| 2021/0016645 A1 * | 1/2021 | Hirneise ............... | B60J 7/1642 |

FOREIGN PATENT DOCUMENTS

| | | |
|---|---|---|
| RU | 201177 | 10/2001 |
| WO | WO 2020101455 A1 | 5/2020 |

OTHER PUBLICATIONS

Machine translation of KR1020120007344A by PatDocs PDF on May 15, 2023 (pp. 10).
Machine translation of RU201177 by PatDocs PDF on May 15, 2023 (pp. 7).
Machine translation of WO2020101455A1 by PatDocs PDF on May 15, 2023 (pp. 13).

* cited by examiner

FORKLIFT CAB ENCLOSURE SYSTEM

CROSS-REFERENCE TO RELATED APPLICATIONS

This application claims the benefit of U.S. Provisional Application No. 63/616,152, filed Dec. 29, 2023, which is hereby incorporated by reference.

FIELD OF THE INVENTION

This invention generally relates to enclosures for vehicle cabs with overhead guards.

BACKGROUND OF THE INVENTION

The present disclosure relates to land vehicles with an overhead guard or roll cage. For example, farm equipment, tractors, and forklifts, among others, include overhead guards to protect operators of the vehicle from injury in the event of a roll-over or an accident. Many of these vehicles operate in extreme conditions, such as cold, heat, dust, rain, snow, or UV exposure. To combat this issue, original equipment manufacturers ("OEM") and after-market manufacturers have provided enclosures that attach to the overhead guard of the land vehicle. Traditionally, this includes vinyl attachments, or for more rigidity, sheet metal with glass panes welded to the overhead guard to provide protection from harsh working conditions.

DETAILED DESCRIPTION OF THE DRAWINGS

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

The uses of the terms "a" and "an" and "the" and similar references in the context of the disclosure (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element.

The present disclosure is directed to an enclosure for a vehicle comprising an overhead guard or roll-cage. Specifically, the present disclosure is directed to an enclosure comprising unitary components configured to independently attach to the vehicle. This allows for an owner/operator of the vehicle to outfit the overhead guard with only the components desired. The specific components include at least a right door panel, a left door panel, a rear windshield, a front windshield, and a roof panel. The present disclosure is further configured to allow independent attachment of the component pieces without the need for modifying the overhead guard and/or the vehicle, including not creating/drilling new holes in the overhead guard to maintain the structural integrity of the overhead guard.

Figure 1:
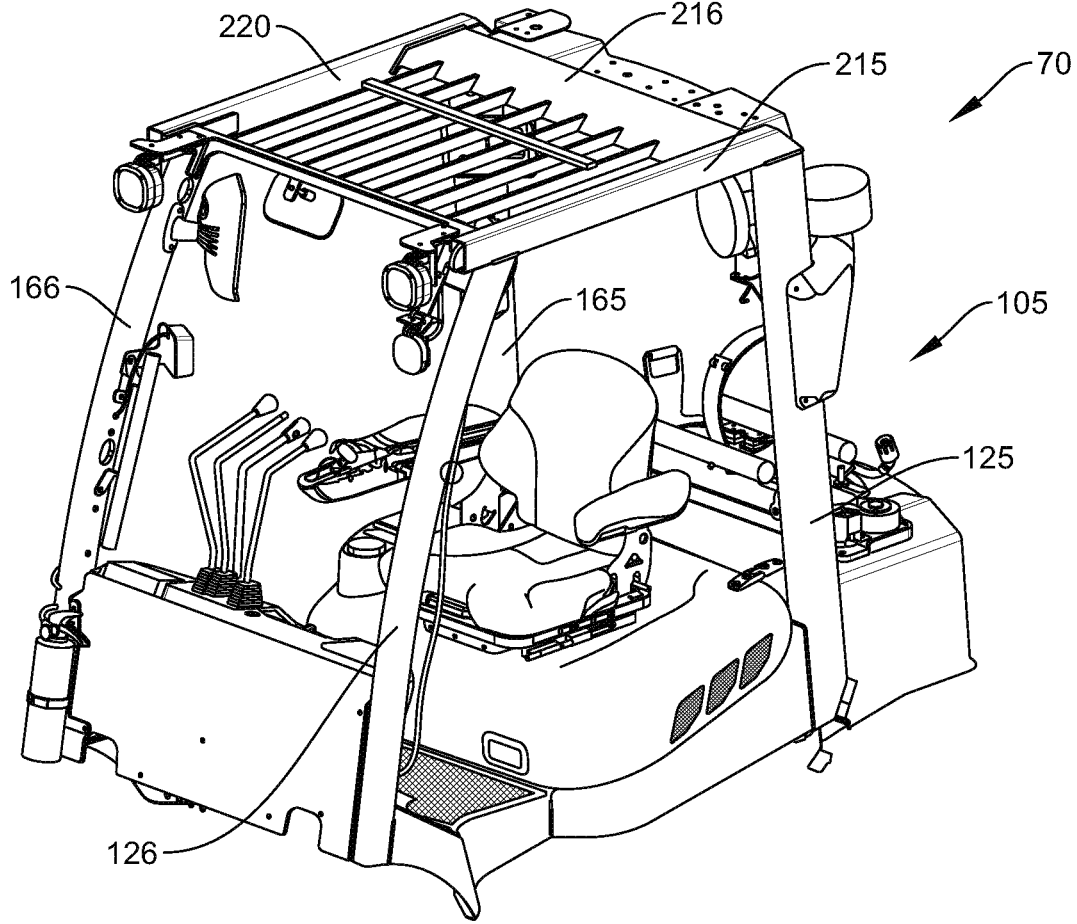
FIG. 1 is a perspective view of a prior art forklift cab.

Referring to FIG. 1, vehicle 105 is illustrated. Vehicle 105 includes overhead guard 70 which includes vertical posts 125, 126, 165, 166 and horizontal posts 215, 216, 220. In this picture, the vehicle 105 is a forklift. However, it should be noted that the exemplar forklift 105 is representative in nature and enclosure 100 may be attached and utilized with any land vehicle comprising an overhead guard/roll-cage, including, but not limited to farm equipment, tractors, industrial machinery, and earth moving equipment.

Figure 2:
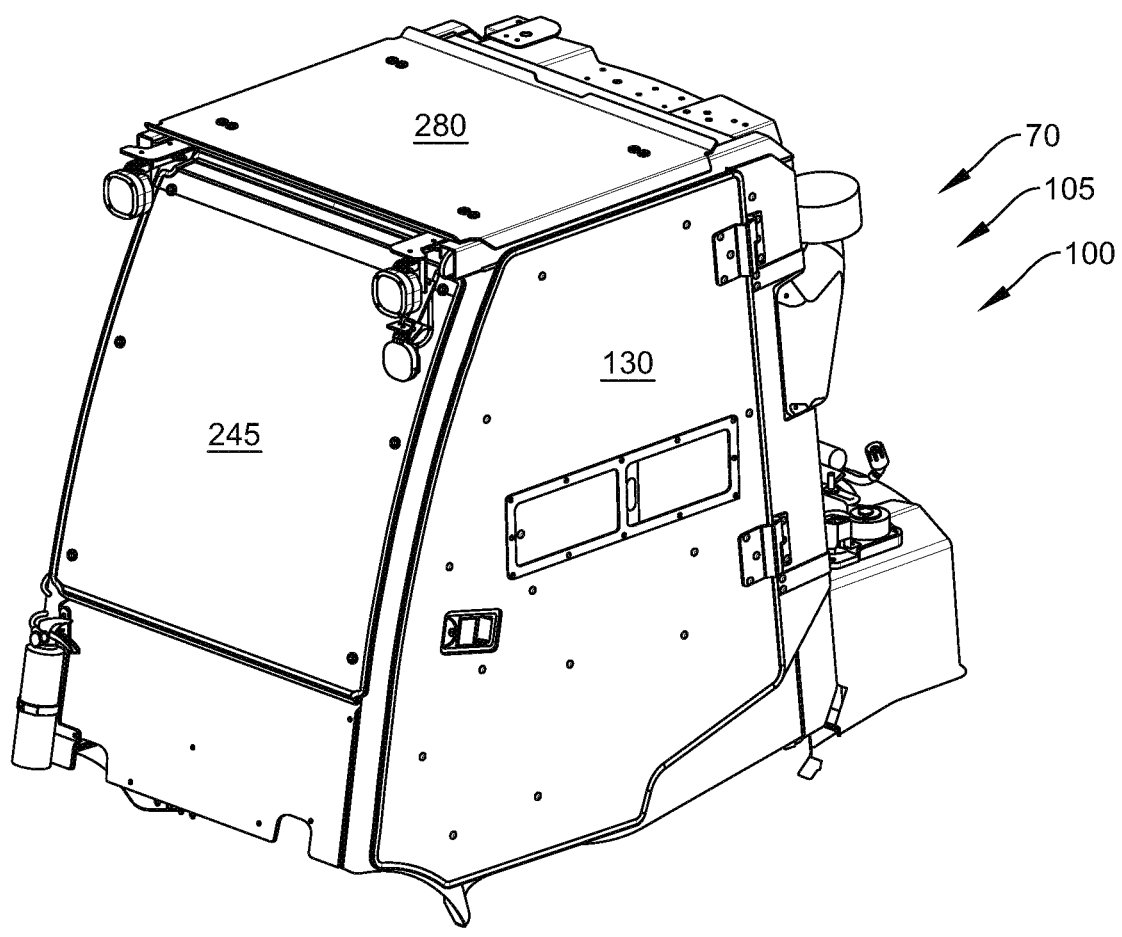
FIG. 2 is a front perspective view of an enclosure on the FIG. 1 forklift cab.
Figure 3:
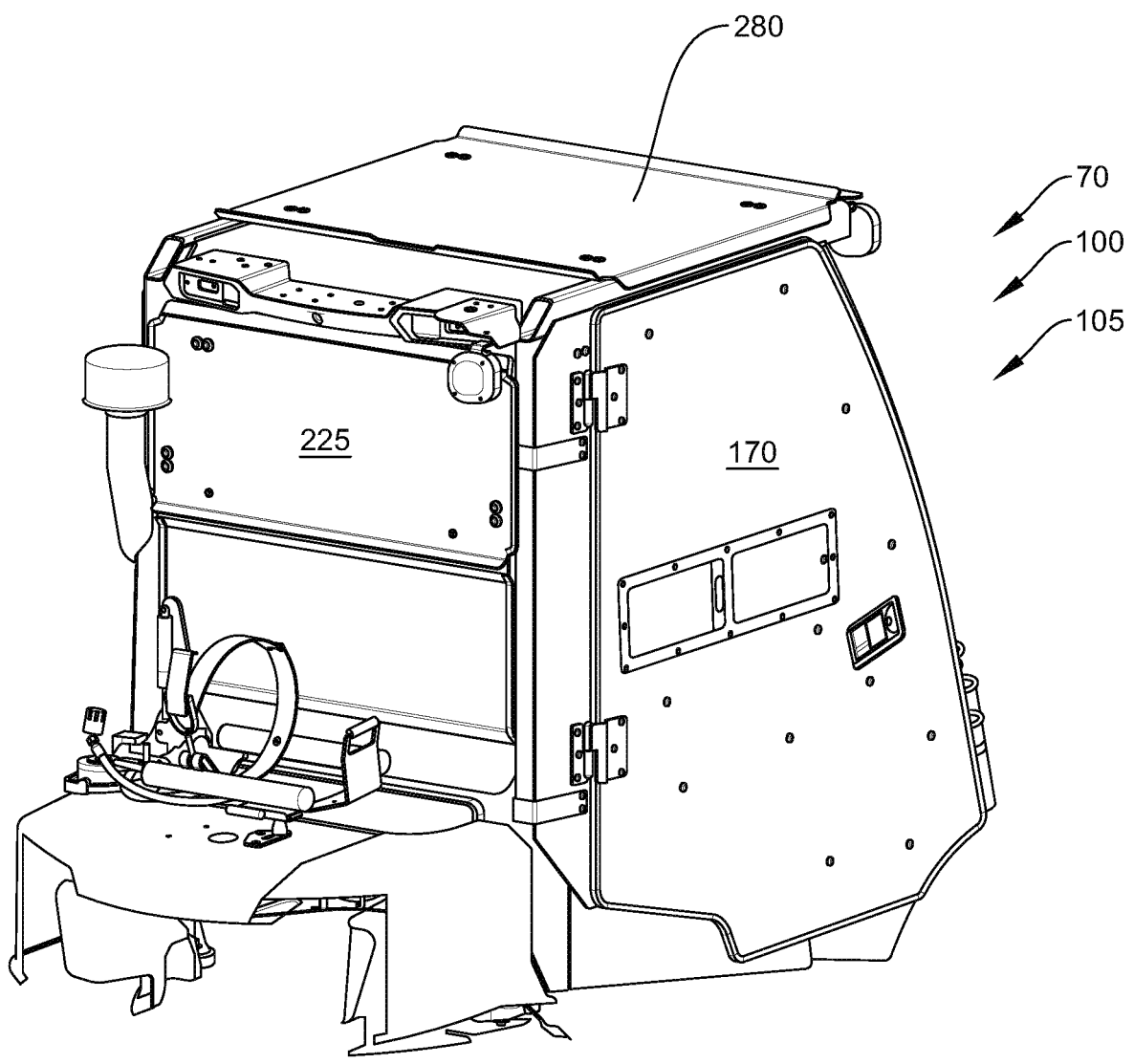
FIG. 3 is a rear perspective view of the FIG. 2 enclosure.

Referring to FIGS. 2 and 3, vehicle 105 is illustrated with enclosure assembly 100 attached to vehicle 105. Enclosure assembly generally includes front windshield 245, rear windshield 225, roof panel 280, right door panel 170 and left door panel 130. Note that while front windshield 245, rear windshield 225, roof panel 280, right door panel 170 and left door panel 130 are illustrated in FIGS. 2 and 3 as being opaque to show each panel, it should be noted that each panel is mostly translucent.

Figure 4:
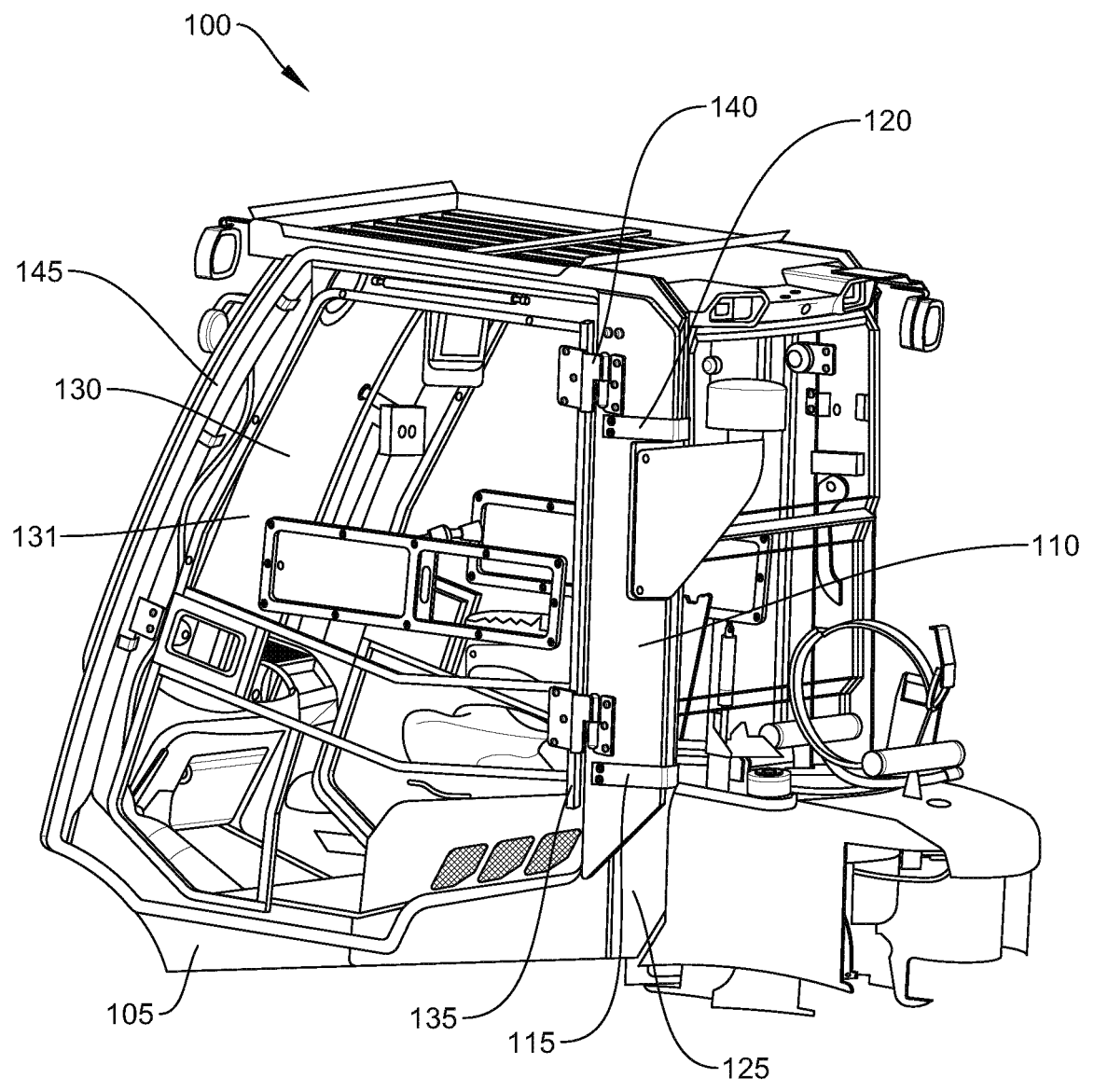
FIG. 4 is a perspective view of a closed door of the left door panel attached to a vehicle.

FIG. 4 illustrates left door panel 130 of enclosure assembly 100 attached to vehicle 105. The left door panel 130 includes a first mounting post 110. The first mounting post 110 is attached to the vehicle 105 by abutting bottom mounting bracket 115 and top mounting bracket 120 to first vertical post 125 of vehicle 105. Mounting brackets 115 and 120 are attached to mounting post 110 via a plurality of fasteners, such as bolts, rivets, etc. The first mounting post 110 acts as an attachment point for a left door 131. As shown, left door 131 is hingably mounted to the first mounting post 110 via a bottom hinge 135 and a top hinge 140. Hinges 135 and 140 allow for the left door 131 to rotate relative to the mounting post 110 allowing for the left door 131 to open and close, thus defining a left door of the enclosure 100. In some embodiments, the periphery/perimeter of the door panel 130 includes seal 145, thus ensuring that the cab of the vehicle 105 is sealed off from the elements. In other embodiments, the door panel 130 does not include seal 145.

Figure 5:
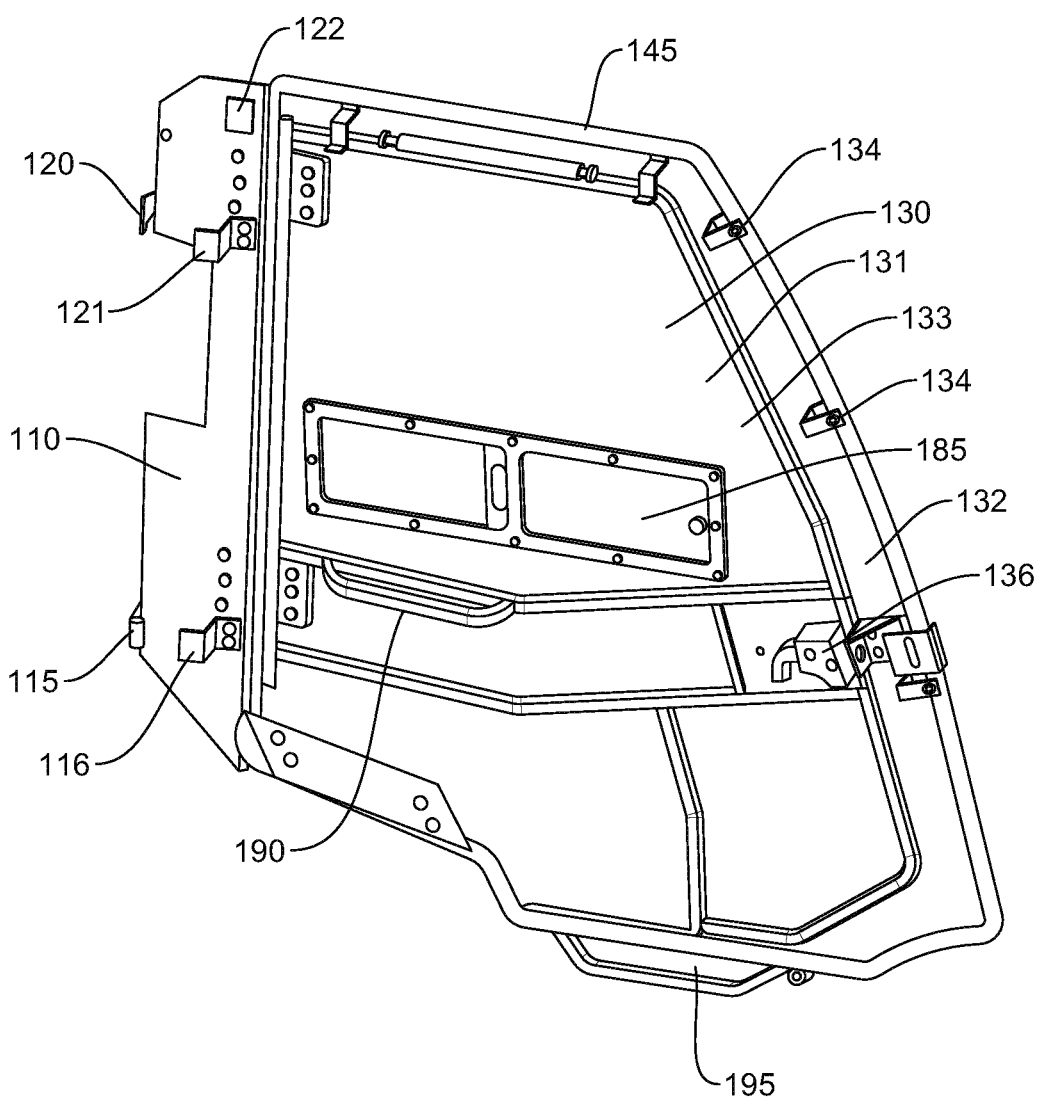
FIG. 5 is a perspective view of an open door of the right door panel.

FIG. 5 depicts the interior of the door panel 130. Door panel 130 includes mounting post 110, door 131, frame 132, window 133, brackets 115, 120, 124, 116, 121 and 122 and latch 136. Door 131 is hinged with respect to mounting post 110 and frame 132 as described above. Mounting post 110 is part of frame 132 which encloses and supports door 131. Frame 132 is attached to vehicle 105 via brackets 115, 120, 124, 116, 121 and 122. Brackets 115, 116, 120 and 121 together surround vertical post 125. Brackets 134 wraps around two sides of vertical post 126. Brackets 116 and 121 are positioned on the inside surface of vertical post 125 while brackets 134 are positioned against the inside surface of vertical post 126. This arrangement secures frame 132 (and door panel 130) on vehicle 105 without requiring any modification to vertical posts 125 or 126.

Door panel 130 includes additional feature that may or may not be present in other panels. Specifically, the door panel 130 includes a window 185. The window 185 is defined by a portion of the door 131 being slidable relative to the door panel 130. As shown, the window 185 includes a framing integrated into the door panel 130. The door panel 130 further includes a handle 190 to assist an operator in opening/closing of the door or getting into/out of the cab of vehicle 105. Additionally, door panel 130 includes a filler panel 195. As shown, the perimeter/periphery of the filler panel 195 includes seal 145. The filler panel 195 is configured to fully enclose the cab of vehicle 105 when the door panel 130 is closed. Specifically, the filler panel 195 has the same shape and size of any steps that lead into the cab (as shown better in FIG. 1). Filler panel 195, and even door panel 130, may have various shapes and sizes to properly seal with vehicles 105 from various OEMs. Further, the right door panel 170 described below may include none, some, or all of the same features as the left door panel 130, as described with reference to FIG. 5.

Figure 6:
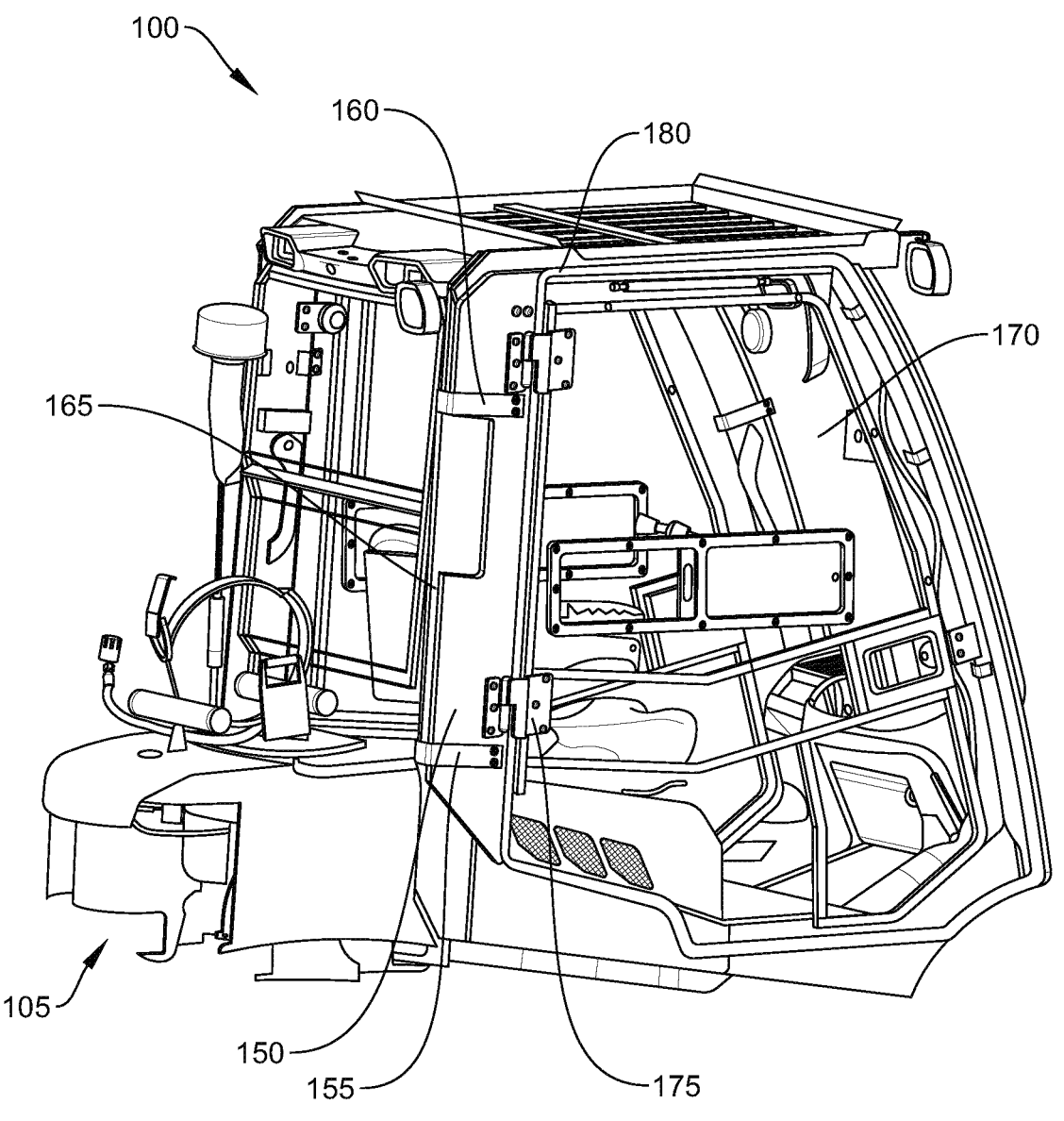
FIG. 6 is a rear perspective view of an open door of the left door panel.

FIG. 6 depicts attachment of a right door of enclosure 100 to vehicle 105. Attachment of the right door is similar to the left door, described with respect to FIG. 4. Specifically, a second mounting post 150 is attached to a second vertical post 165 of the vehicle 105 by attachment of bottom mounting bracket 155 and top mounting bracket 160 to the second vertical post 165. Further, door panel 170 is hingably mounted to the second mounting post 150 via hinges 175, 180, defining a second door of enclosure 100.

Figure 7:
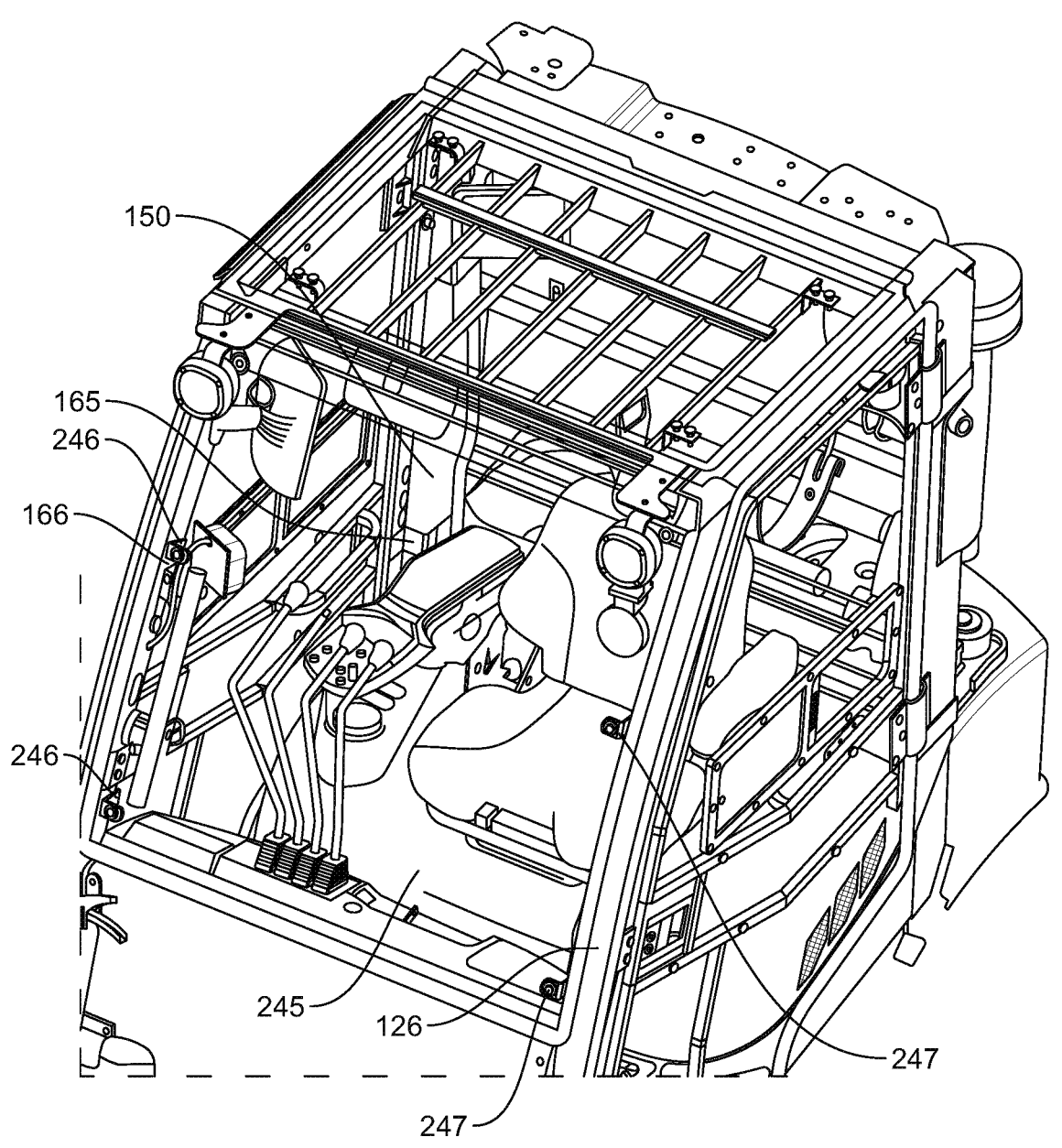
FIG. 7 is a top perspective view of a cab enclosure attached to a vehicle.

FIG. 7 illustrates front windshield 245 attached to vehicle 105. Front windshield 245 includes brackets 246 and bracket 247. Brackets 246 mount against the inside wall of vertical post 166 while brackets 247 mount against the inside wall of vertical post 126. This arrangement secures front windshield 245 on vehicle 105 without requiring any modification to vertical posts 126 or 166.

FIG. 7 also illustrates interior bottom mounting bracket 200 attaching the second mounting post 150 to the second vertical post 165 of vehicle 105. It should be noted that, in this embodiment, a similar mounting bracket is used to attach the first mounting post 110 to the first vertical post 125 of vehicle 105 to attach the left door panel 130 thereto.

Figure 8:
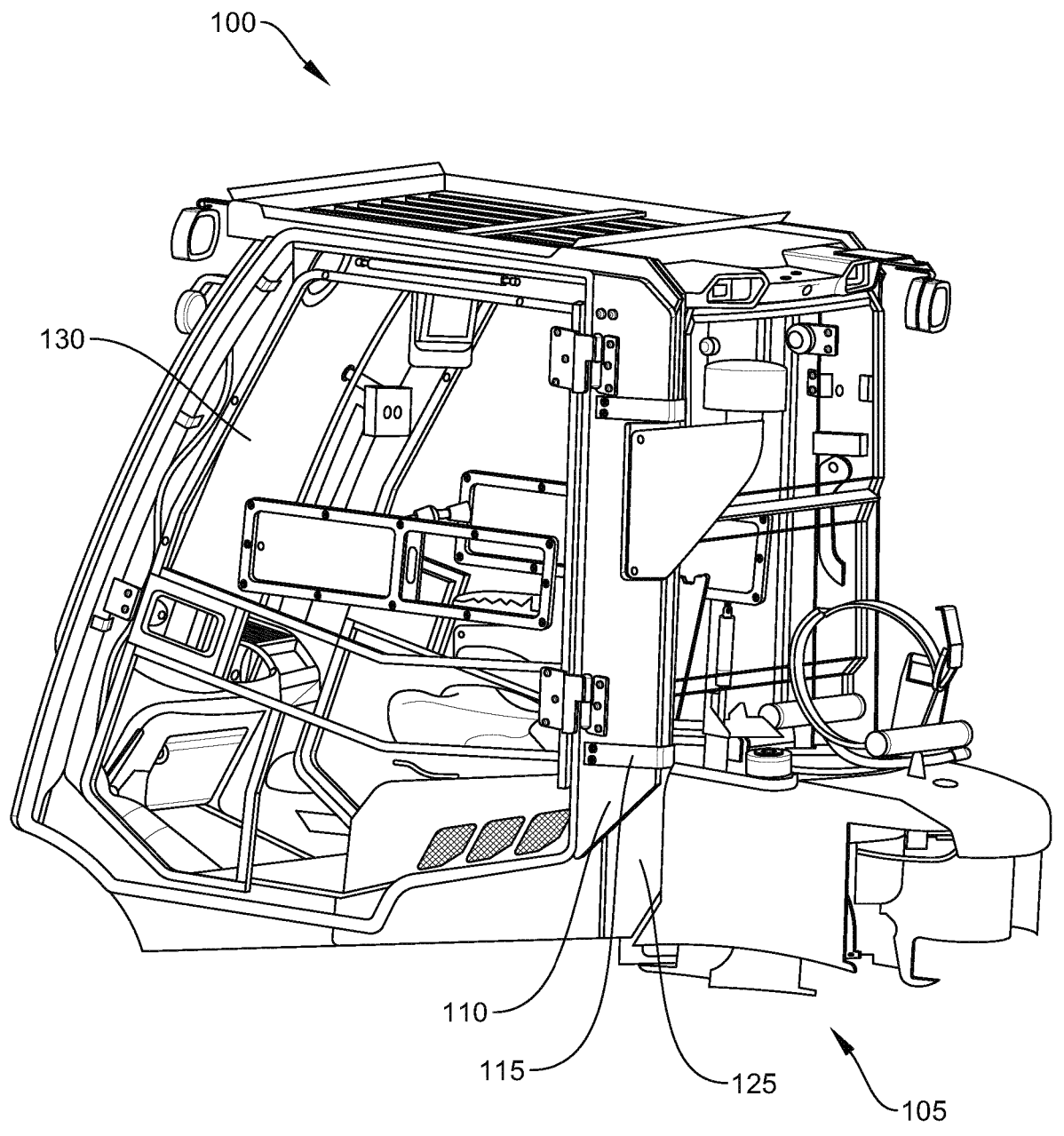
FIG. 8 is a perspective side view of the attachment of a mounting post to the vehicle viewed from the outside of the vehicle.

FIG. 8 is a view of the bottom mounting bracket 115 securing the first mounting post 110 to the first vertical post 125 of vehicle 105. In this embodiment, the shape of the mounting post 110 is matched to the shape of first vertical post 125 of vehicle 105. The matched shape of the first mounting post 110 allows for the enclosure 100 to fully enclose the cab of vehicle 105 from the outside environment. In other embodiments, the mounting posts 110, 150 are not matched to the shape of the verticals posts 125, 165 of vehicle 105. In yet other embodiments, the mounting posts 110, 150 are matched to the shape of various OEM vehicles.

Figure 9:
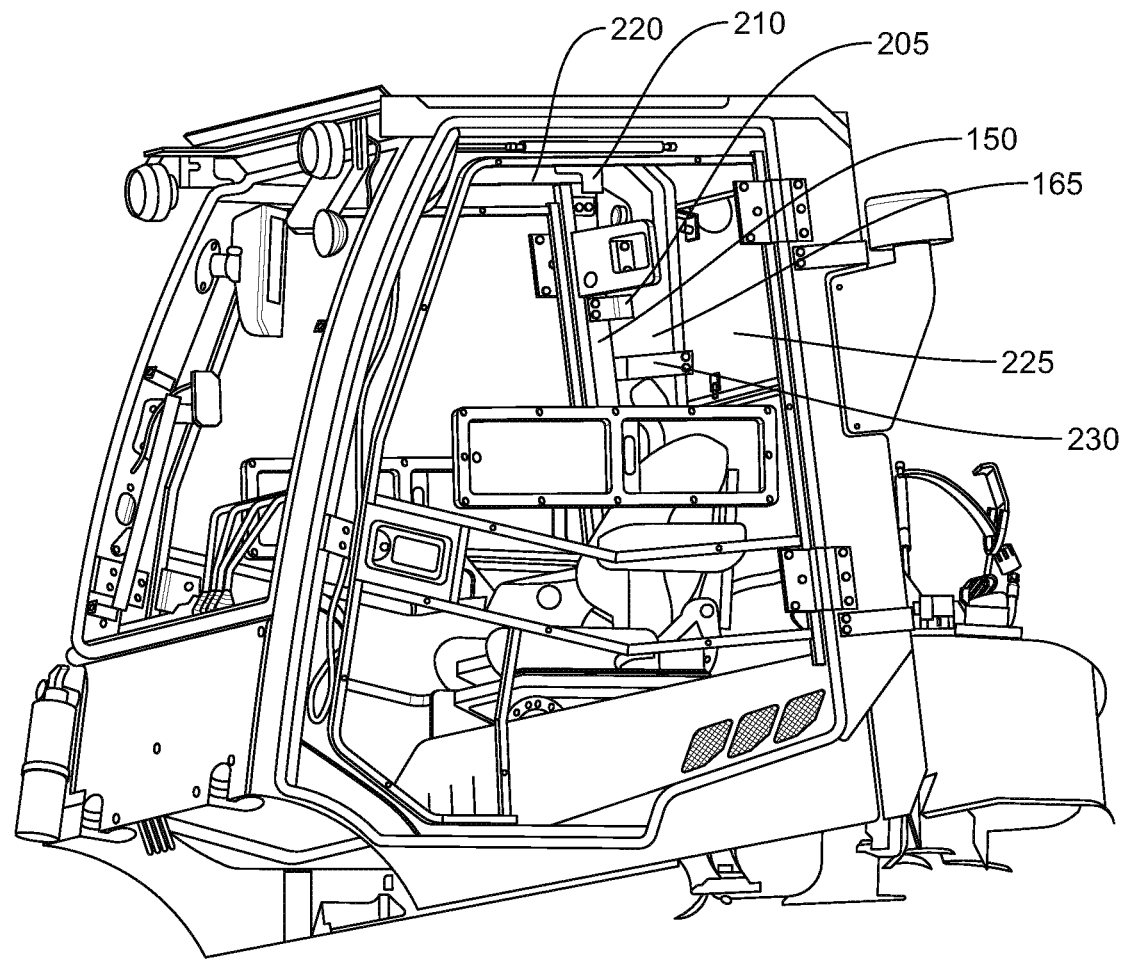
FIG. 9 is a view of the attachment of a mounting post of the present disclosure to the vehicle and of attachment of the rear windshield to the vehicle.

FIG. 9 is an interior view of attachment of the second mounting post 150 to the second vertical post 165 of vehicle 105. In this embodiment, the mounting post 150 includes additional mounting brackets. Specifically, the mounting post 150 includes mounting bracket 205 attached to the second vertical post 165. In this embodiment, the mounting post further includes upper mounting bracket 210, which secures the mounting post to a second horizontal post 220 of the overhead guard. In this embodiment, the mounting post 150 is thus secured to the second vertical post by brackets 155, 160, 200, and 205 and secured to the second horizontal post by bracket 210. As such, the mounting post is secured laterally, horizontally, and vertically. Further, the brackets act as clamps to secure the mounting post to the vertical post. In other embodiments, the brackets may be bolted to the post using bolt holes drilled by the OEM, thus still ensuring the structural integrity of the overhead guard.

5

Figure 10:
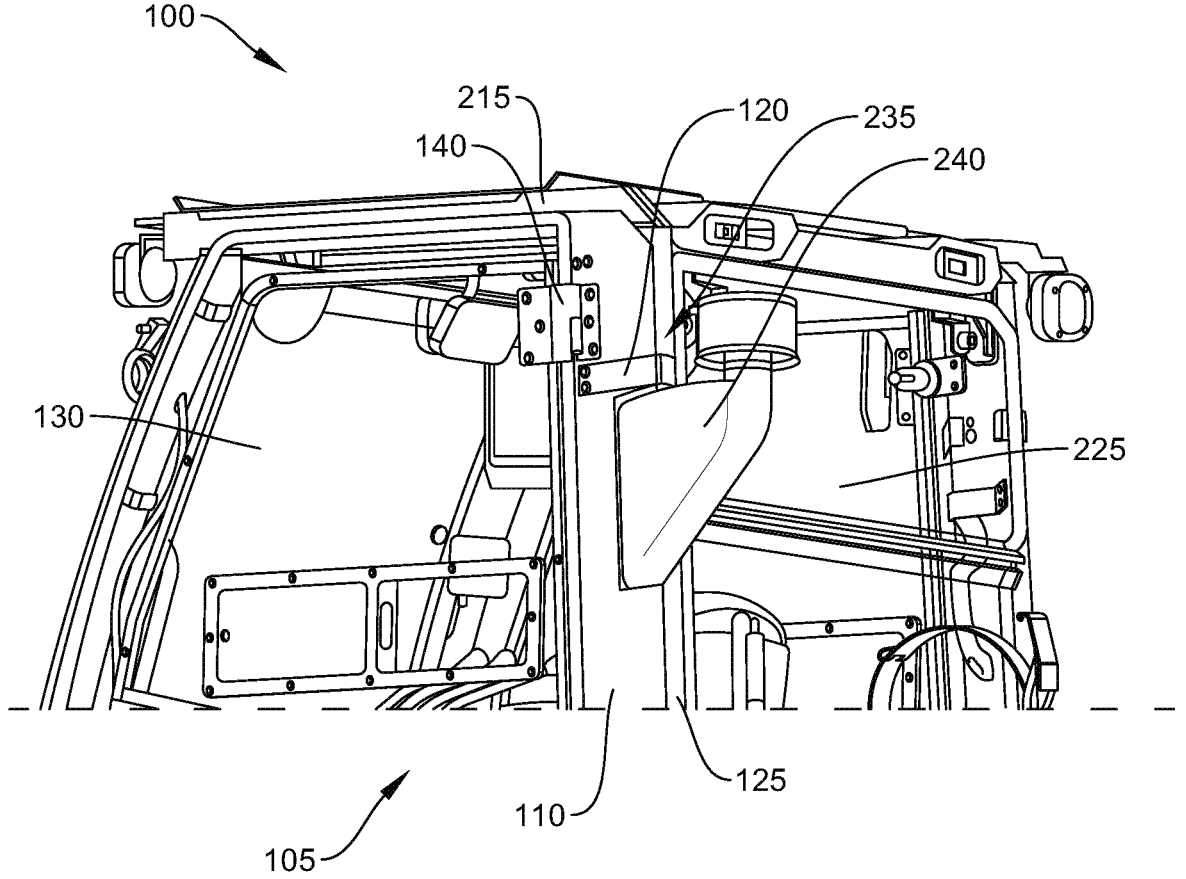
FIG. 10 is a view of the attachment of a mounting post to the vehicle and of attachment of the rear windshield to the vehicle.

The rear windshield 225 is also depicted in FIG. 9 and further shown in FIG. 10. As shown, the rear windshield 225 is attached to the second vertical post 165 via inner mounting bracket 230. In this embodiment, the rear windshield 225 is similarly attached to the first vertical post 110. FIG. 7 depicts attachment of the rear windshield 225 to the first vertical post via outer mounting bracket 235. For clarity, bracket 240 is an accessory bracket for attaching an accessory to the vehicle 105 and does not secure enclosure 100 to vehicle 105.

In some embodiments, the outer mounting bracket 235 of the rear windshield is slightly overlapped with the upper mounting bracket 120 of the left door panel 130 on the first vertical post 125. In other embodiments, the mounting brackets 120, 235 do not overlap. In either event, the mounting brackets 120, 235 are generally vertically stacked along the first vertical post 125 of the overhead guard. This is also true for the corresponding mounting brackets with respect to the second mounting post 165, the opposing end of rear windshield 225, and the second vertical post 150. Said differently, attachment of the first mounting post 110 and left door panel 130, the second mounting post 150 and the right door panel 170, and the rear windshield are all independent of one another. Thus, an owner and/or operator of vehicle 105 may independently select component pieces of enclosure 100 to attach to vehicle 105. This configuration further allows easy attachment and removal of said component pieces without the need for altering the overhead guard.

Figure 11:
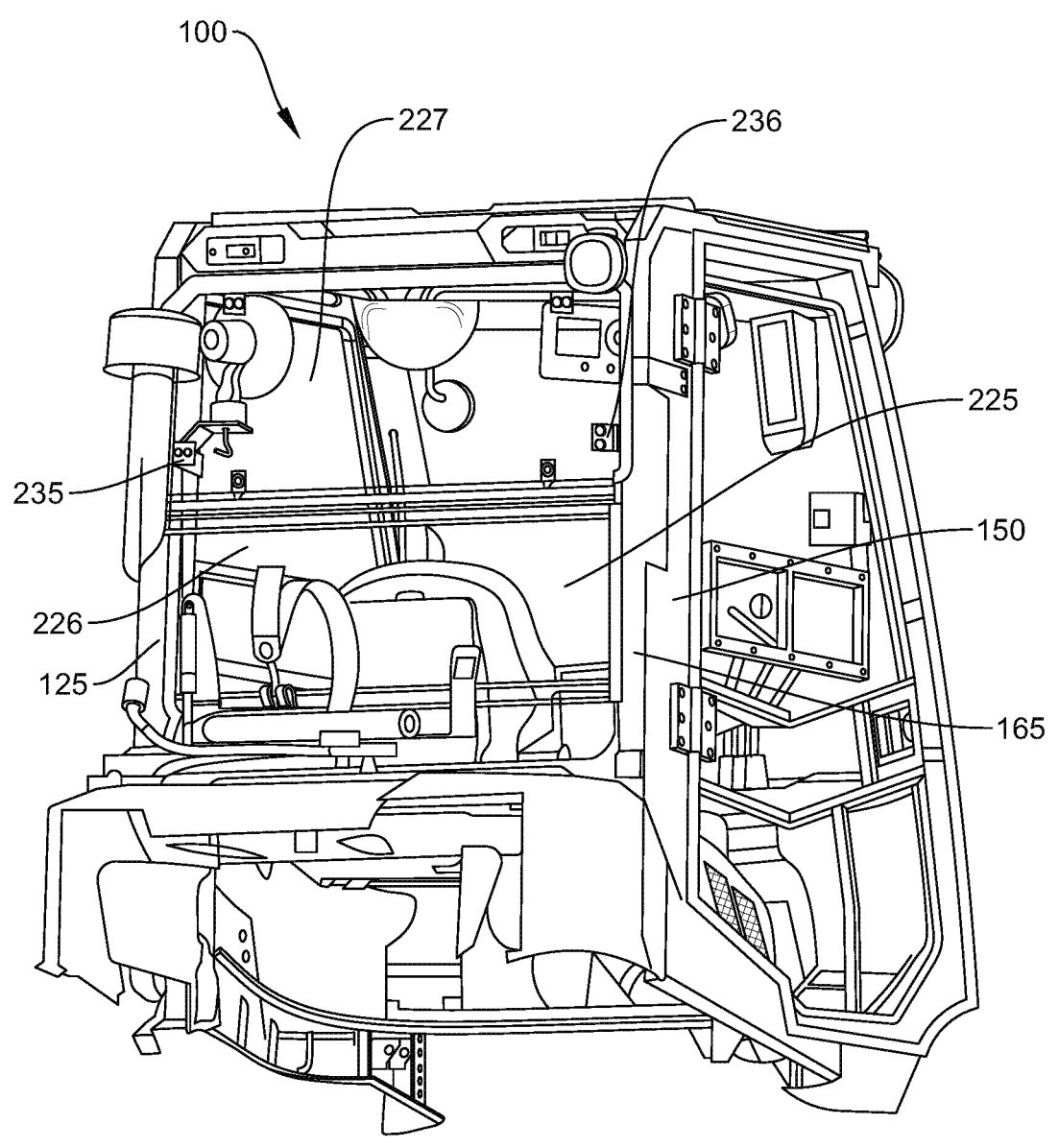
FIG. 11 is a rear view of the vehicle with the rear windshield attached to the vehicle.

FIG. 11 depicts a rear view of vehicle 105 with rear windshield 225 attached thereto. As shown, rear windshield 225 comprises two separate panels, a lower panel 226 and an upper panel 227. In other embodiments, the rear windshield 225 comprises a singular panel. As shown, the panels 226, 227 include seal 145 around the periphery/perimeter. The rear windshield is secured to the first vertical post 125 via outer mounting bracket 235 and attached to the second vertical post 165 via outer mounting bracket 236. As such, in this embodiment, brackets 230, 235, 236 and an additional inner bracket similar to bracket 230 (not shown) secure the rear windshield to the vehicle 105.

Figure 12:
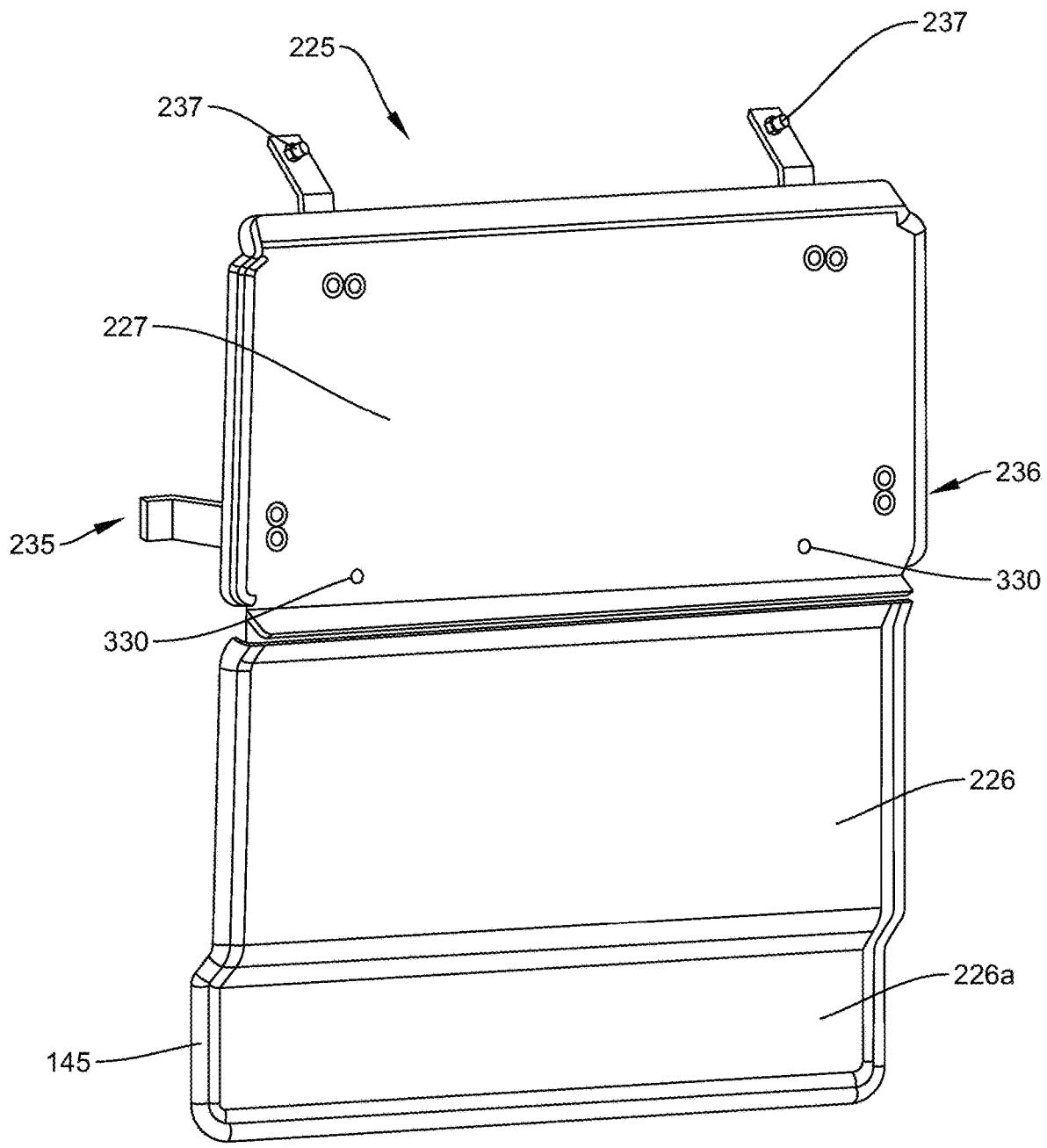
FIG. 12 is a perspective view of an embodiment of a rear windshield according to the present disclosure.

FIG. 12 illustrates a perspective view of an embodiment of a rear windshield 225. This embodiment of rear windshield 225 includes a lower panel 226 and an upper panel 227. The lower panel 226 and the upper panel 227 are connected via fasteners 330. In this embodiment, lower panel 226 includes an additional panel 226a, which lies on a different vertical axis than panel 226. Lower panel 226 and additional panel 226a are connected by a tapered portion, as shown. As shown, the tapered portion my position additional panel 226a closer to the cab of the vehicle 105. In other embodiments, the additional panel 226a may be further from the cab than lower panel 226. The shape of panels 226/226a/227 may change depending on the vehicle 105 that the cab enclosure 100 is attached to.

In this embodiment, the rear windshield 225 panels are made of polycarbonate material. As illustrated, panels 226/226a are formed of one piece of material. In other embodiments, the panels 226/226a may comprise separate pieces connected by fasteners. Further, in other embodiments, glass may be used. The rear windshield 225 of FIG. 13 also includes a seal 145 around the perimeter/periphery. Some, none, or all of the periphery of rear windshield 225 may includes seal 145, depending on the design of vehicle 105 and its intended use/work environment.

Rear windshield 225 of FIG. 12 is secured to the first and second vertical posts 125, 165 via mounting brackets 235, 236, respectively. Specifically, the mounting brackets 235, 236 secure the rear windshield 225 to two surfaces of the respective mounting posts 125, 165. In this embodiment, rear windshield 225 also includes mounting brackets 237, configured to attach to the horizontal mounting post 216 of vehicle 105. As shown, mounting brackets 237 are configure to be secured via fasteners that engage with OEM bolt holes already drilled in post 216, thus ensuring ease of install without the need for new bolt holes/compromised structural integrity of post 216.

Figure 13:
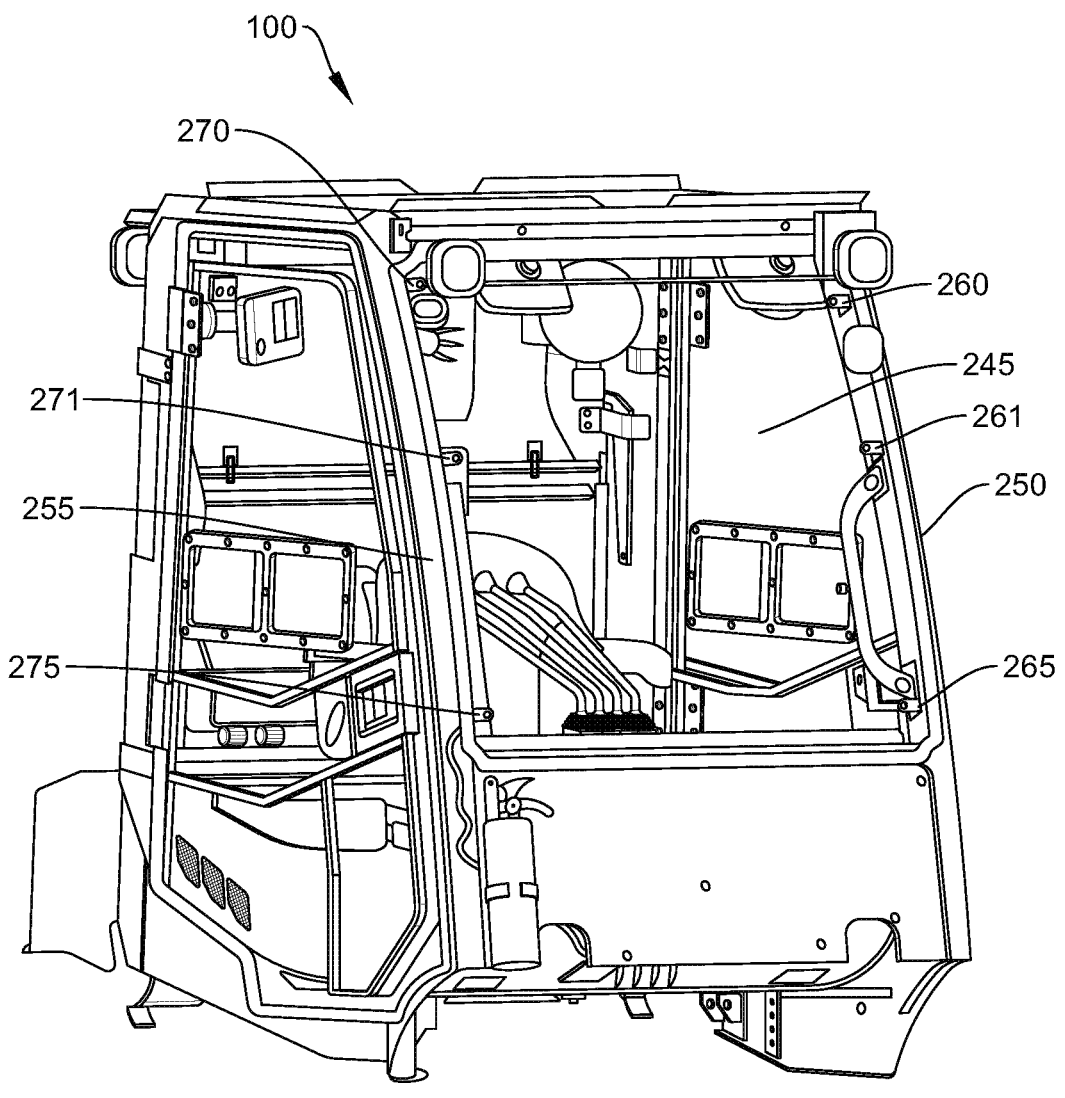
FIG. 13 is a front perspective view of the front windshield attached to the vehicle.

FIG. 13 depicts front windshield 245 attached to vehicle 105. The front windshield also includes seal 145 around its perimeter/periphery. One end of the front windshield 245 is attached to a third vertical post 250 of the overhead guard via mounting brackets 260, 265. Similarly, the opposing end of the front windshield 245 is secured to a fourth vertical post 255 of the overhead guard via mounting brackets 270, 275. Again, the mounting brackets, 260, 265, 270, 275 do not require new holes to be drilled into the third and fourth vertical posts 250, 255. Rather, the mounting brackets act as clamps that secure the front windshield 245 to the vehicle 105. In some embodiments, the front windshield 245 is additionally secured to the third and fourth vertical posts 250, 255 via mounting brackets 261, 271, respectively.

Figure 14:
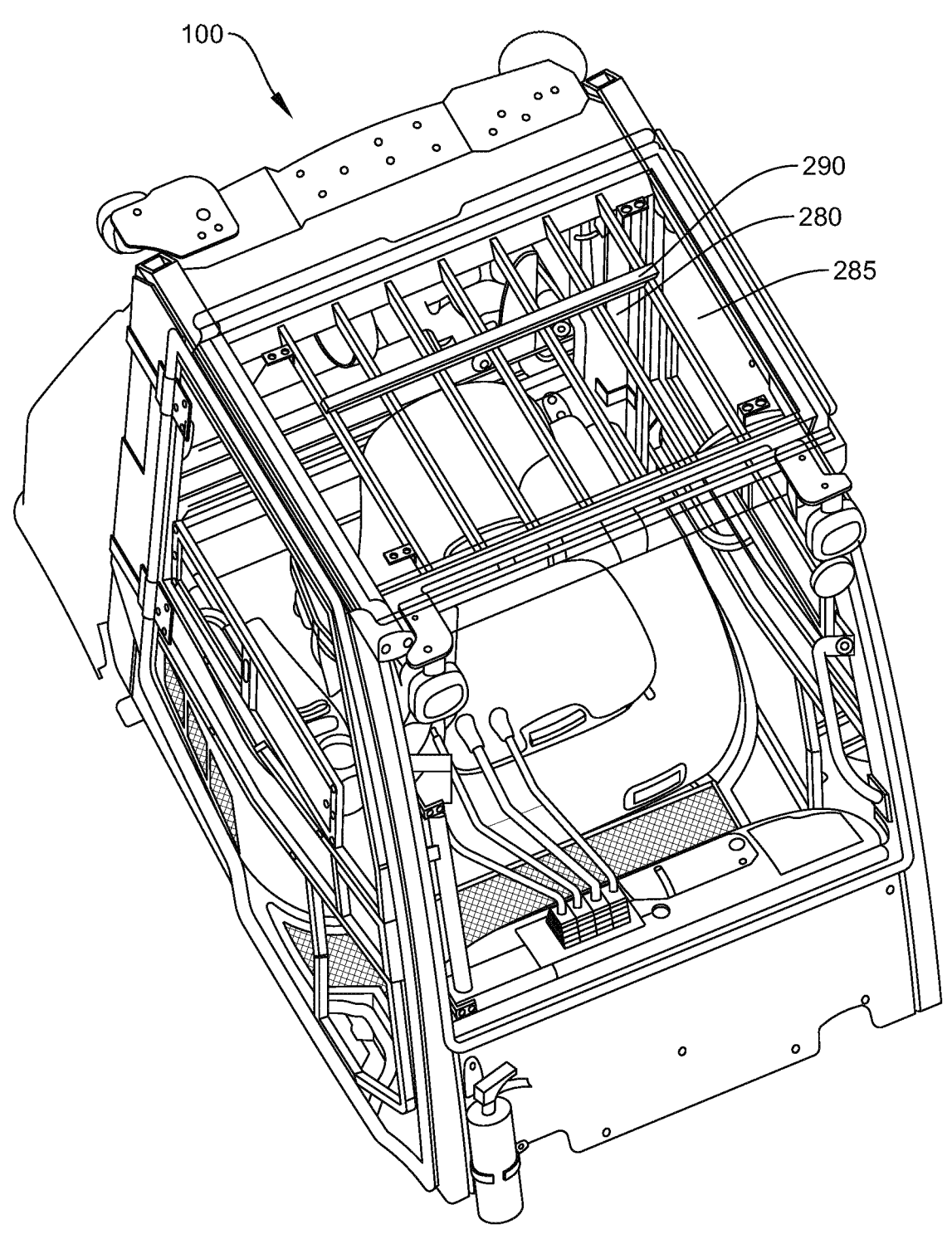
FIG. 14 is a top perspective view of the roof panel attached to the vehicle.
Figure 15:
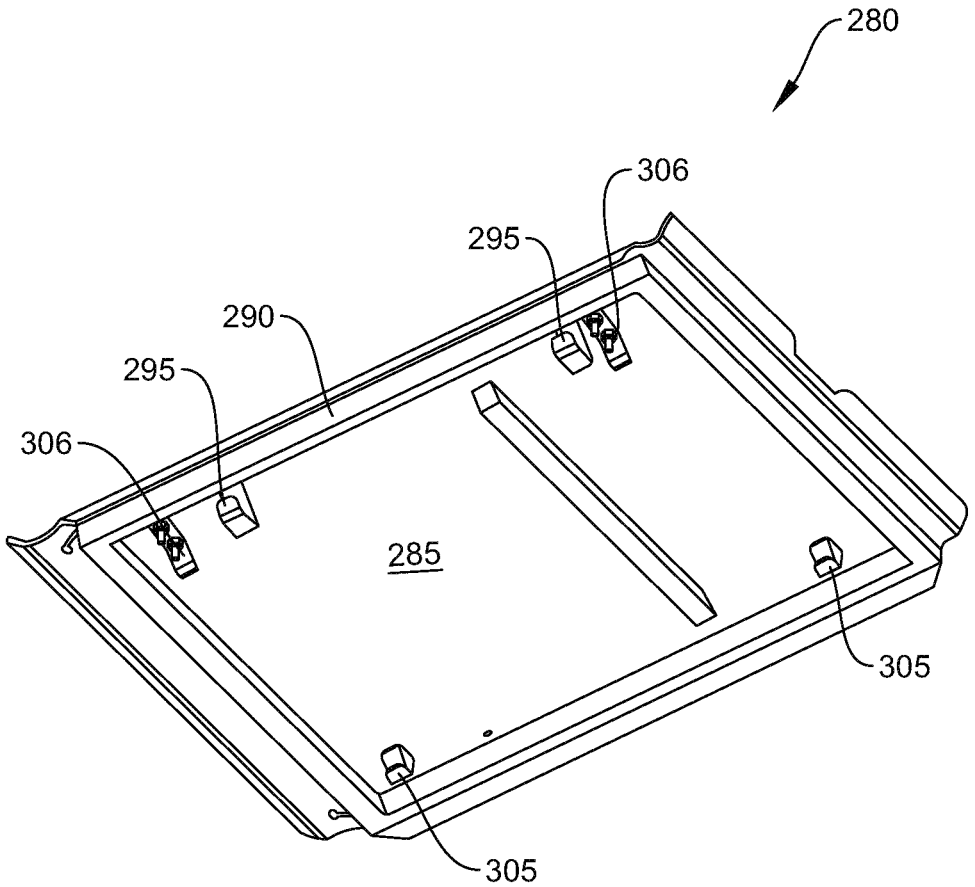
FIG. 15 is a top perspective view of an embodiment of the roof panel according to the present disclosure.

FIGS. 14 and FIG. 15 depict roof panel 280, which generally includes panel 285 atop frame 290, brackets 295, 305 and 306. Similar to the first and second mounting posts, and the front and rear windshields, the roof panel 280 is secured to the overhead guard via mounting brackets. The roof panel 280 is configured to protect the overhead guard and the operator of vehicle 105 from falling objects (i.e., in a warehouse) and/or from precipitation. The panel 285, as well as the other panels (the door panels, rear windshield, and front windshield) are comprised of plexiglass or a similar rigid, clear material.

Frame 285 is configured to sit atop the overhead guard, while mounting brackets 295 secure the roof panel 280 to the parallel and perpendicular slats of the overhead guard. The roof panel 280 is further secured to the overhead guard via one or more mounting brackets 295, 305 and 306, which are configured to attach the roof panel 280 to the first and second horizontal posts 215, 220 of the overhead guard. Additionally, the roof panel 280 includes one or more horizontal mounting brackets 305 and 306 prevent movement roof panel 280. Specifically, the mounting brackets 305 and 306 are secured on parallel slats of the overhead guard, thereby resisting horizontal movement of roof panel 280 relative to the overhead guard. In some embodiments, the mounting structure defined by brackets 295, 305, and 306, partially envelops at least one of the horizontal mounting posts 215, 216, 220. In other embodiments, the mounting structure for the roof panel 280 fully envelops at least one of the horizontal mounting posts 215, 216, 220. In any event, no one particular bracket completely envelops vertical posts 125, 165.

The present disclosure also relates to a method for outfitting a vehicle 105 with a cab enclosure 100. Although shown with respect to a specific embodiment, those of skill in the art will appreciate the interchangeability of the described method and embodiment with various cab enclosure systems 100.

Figure 16:
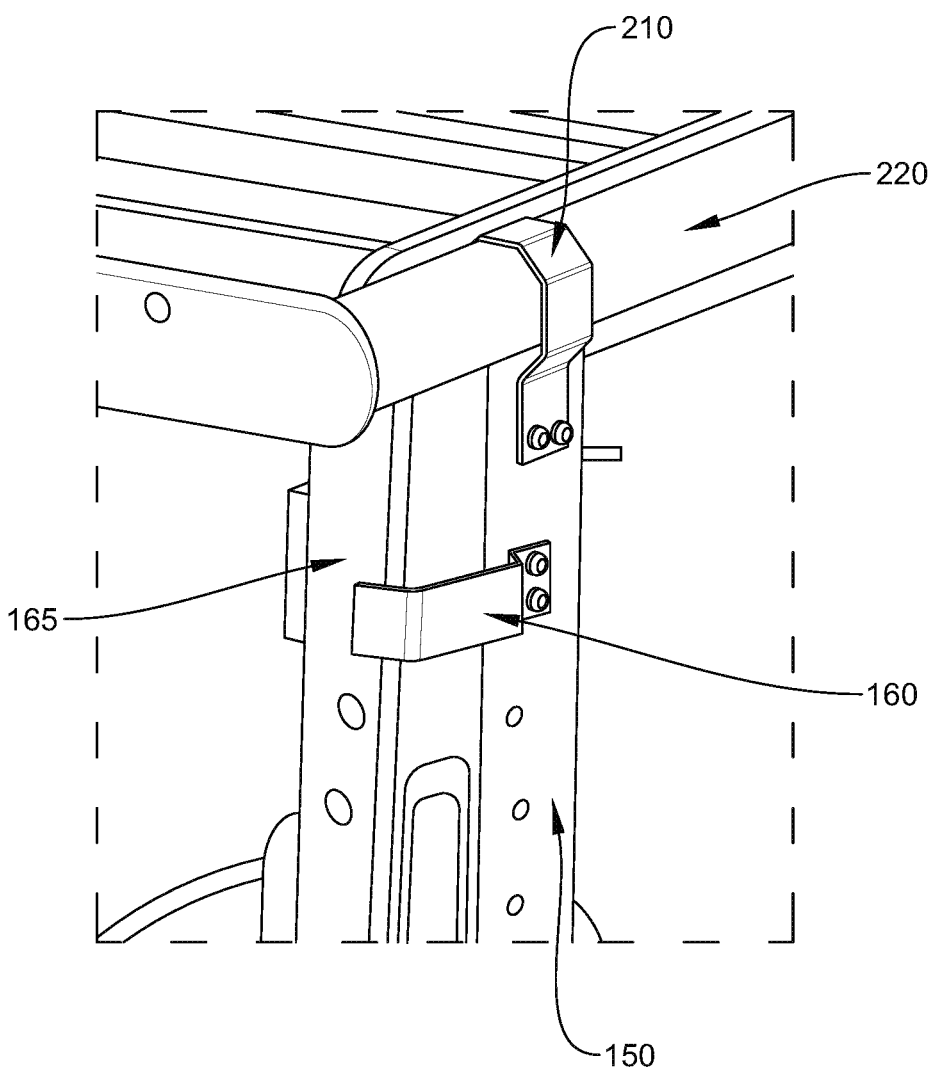
FIG. 16 is a perspective view of an embodiment of a mounting post attached to a vertical post of the vehicle.

Turning now to FIGS. 16 through 23, a method of attaching a door panel 170 to the vehicle 105 is disclosed. Turning to FIG. 16, a mounting post 150 is attached to a vertical post 165. In this embodiment, mounting clamp 165 secures the mounting post 150 to vertical post 165. Simultaneously, mounting clamp 210 secures mounting post 150 to horizontal post 220 of vehicle 105. As shown, mounting clamp 210 is located on the exterior portion of mounting post 150, and thus, is located exterior to the cab of vehicle 105. In other embodiments, clamp 210 may be located on the interior of the cab of vehicle 105 to secure mounting post 150 to horizontal post 220.

Figure 17:
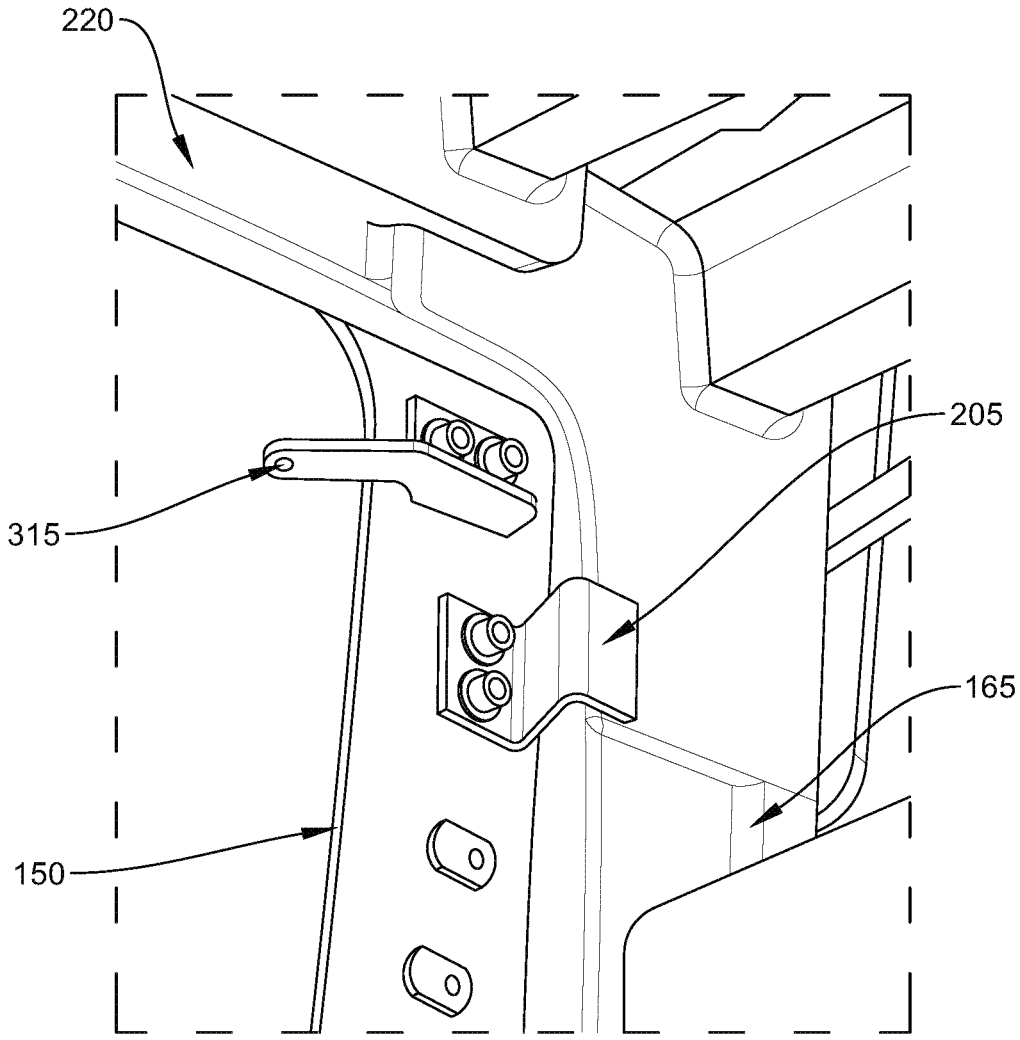
FIG. 17 is a zoomed in view of a gas spring bracket attached to a mounting post.

FIG. 17 is an interior view of the mounting post 150 depicted in FIG. 16. A mounting clamp 205 is secured to the inner portion of mounting post 150 and further secures the mounting post 150 to the vertical post 165. In some embodiments, a gas spring mounting bracket 315 is secured to the interior portion of mounting post 150. The bracket 315 is optionally included in the event the door panel 170 is outfitted with a gas spring 181, discussed in more detail below.

Figure 18:
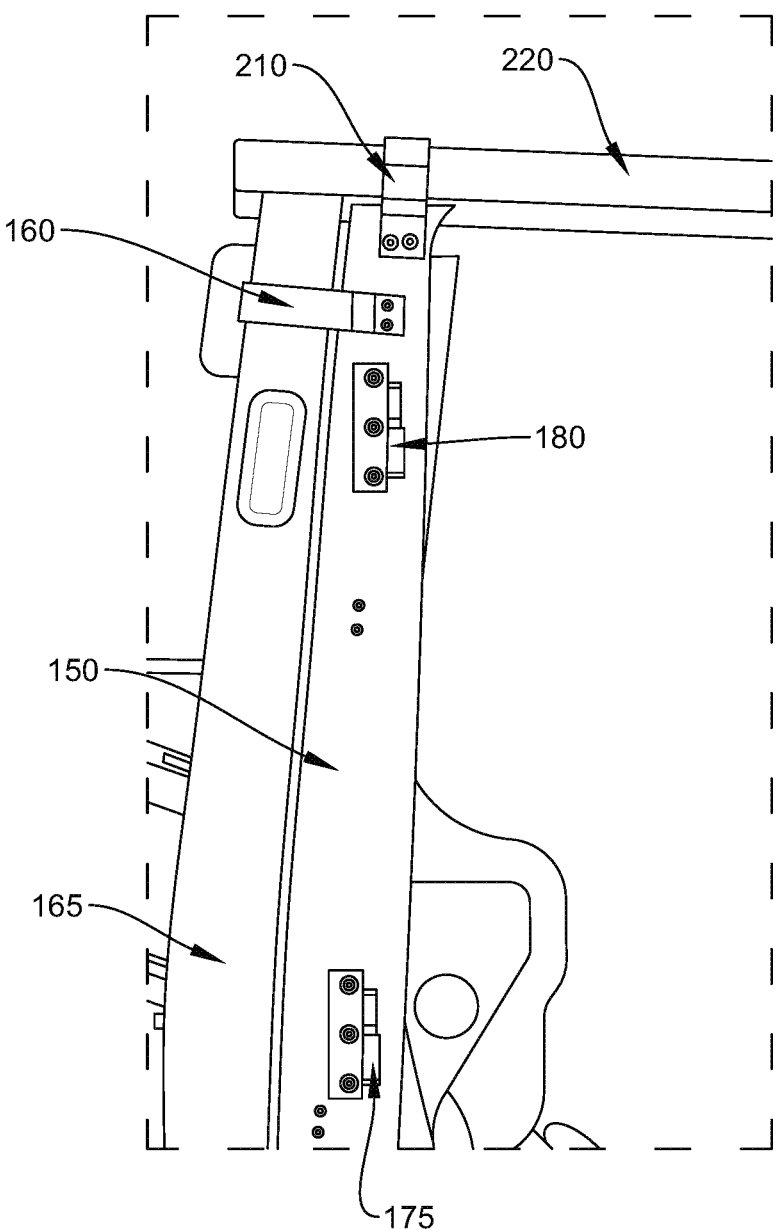
FIG. 18 is a side view of a partially assembled door panel, according to one embodiment.

In FIG. 18, hinges 175 and 180 are secured to the outer portion of mounting post 150 utilizing any appropriate attachment means, such as fasteners. Hinges 175 and 180 are configured to mate with corresponding portions of hinges 175, 180 located on the door panel 170.

Figure 19:
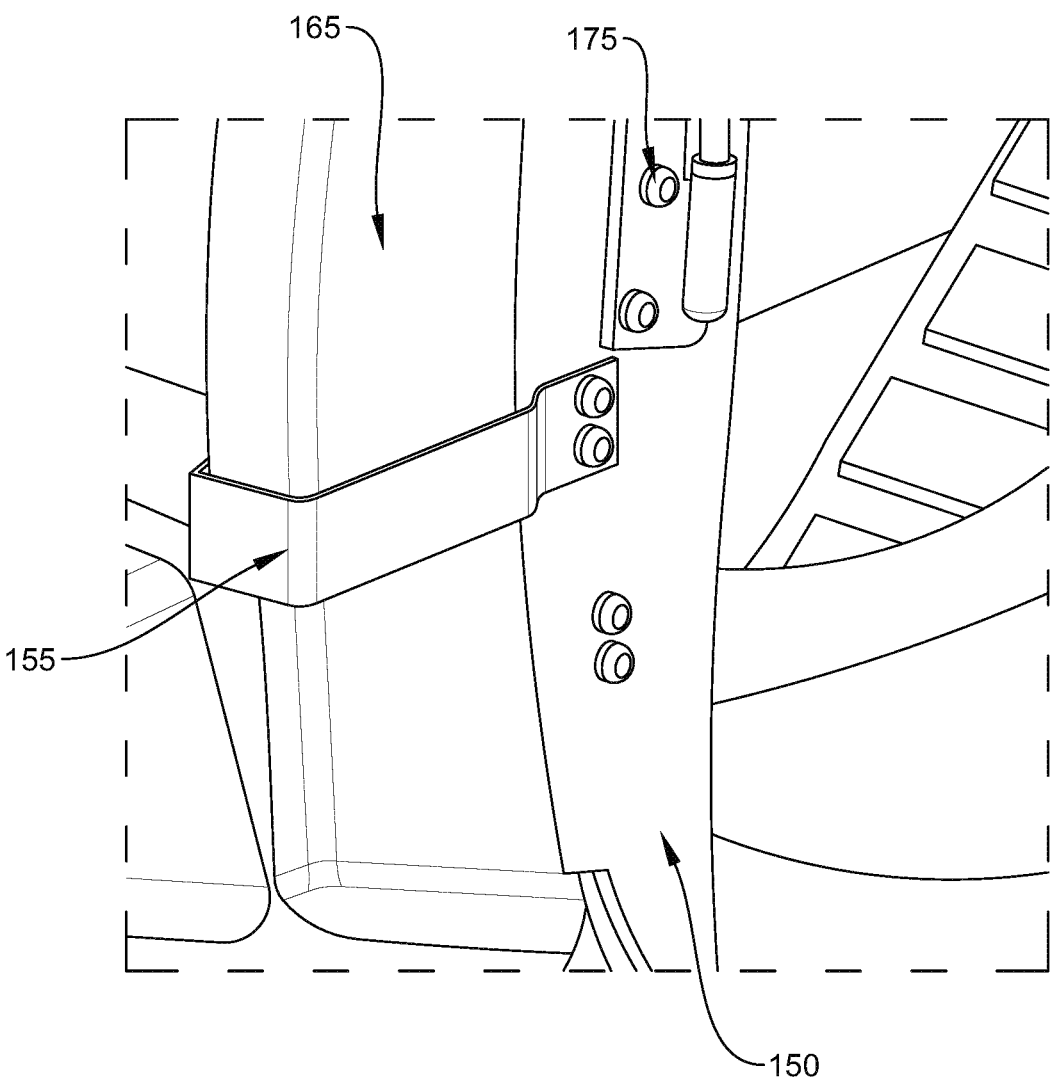
FIG. 19 is a zoomed in view of the door panel of FIG. 18 with additional mounting brackets attached.

At FIG. 19, bottom mounting bracket 155 is secured to the mounting post 150 via fasteners around the vertical post 165 of vehicle 105. Although discussed with reference to particular figures, it should be noted that the order of attachment of the components discussed with reference to FIGS. 16 through 19 is not particularly important. However, the mounting mechanisms discussed allow for attachment of the door panel 170 without the need for attaching other components of enclosure system 100.

Figure 20:
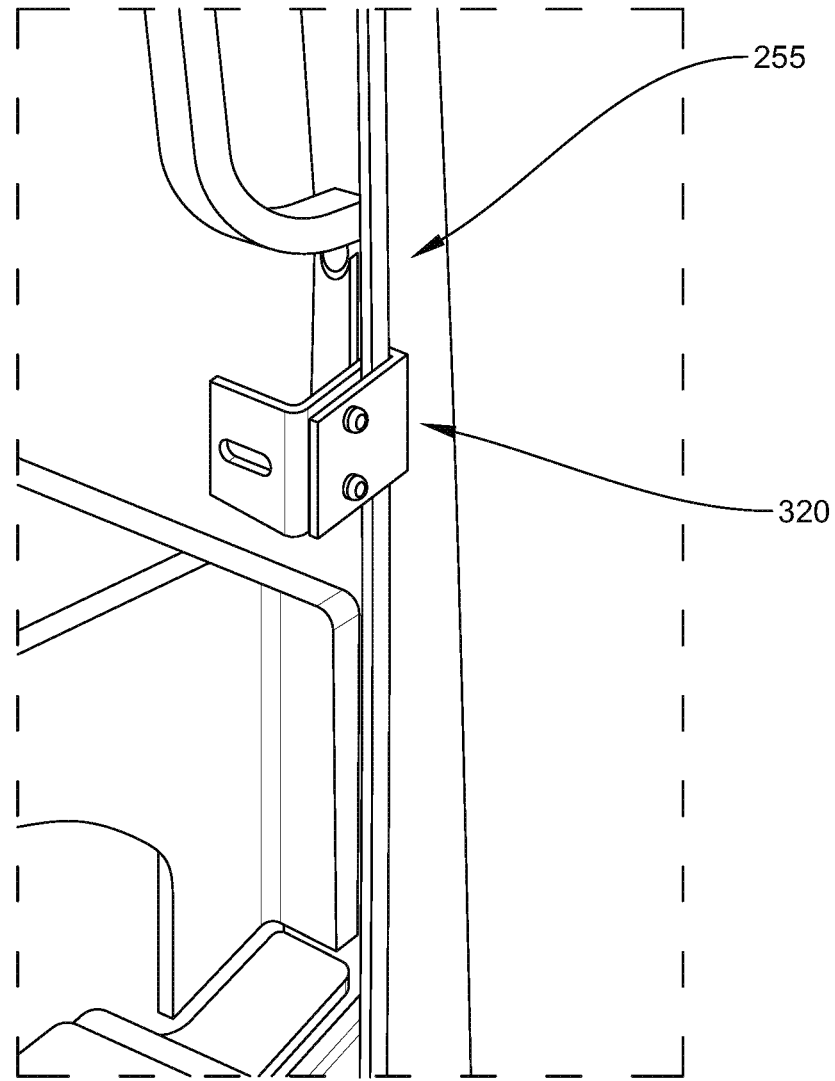
FIG. 20 is a zoomed in view of a fourth mounting post of the vehicle.

In some embodiments, the door panel(s) 170 include a handle configured to secure the door in a closed position. As shown in FIG. 20, in such embodiments, a handle bracket 320 is attached to the fourth vertical post 255 of vehicle 105. The handle bracket 320 is configured to receive the latch door handle and thus secure the door in a closed configuration.

Figure 21:
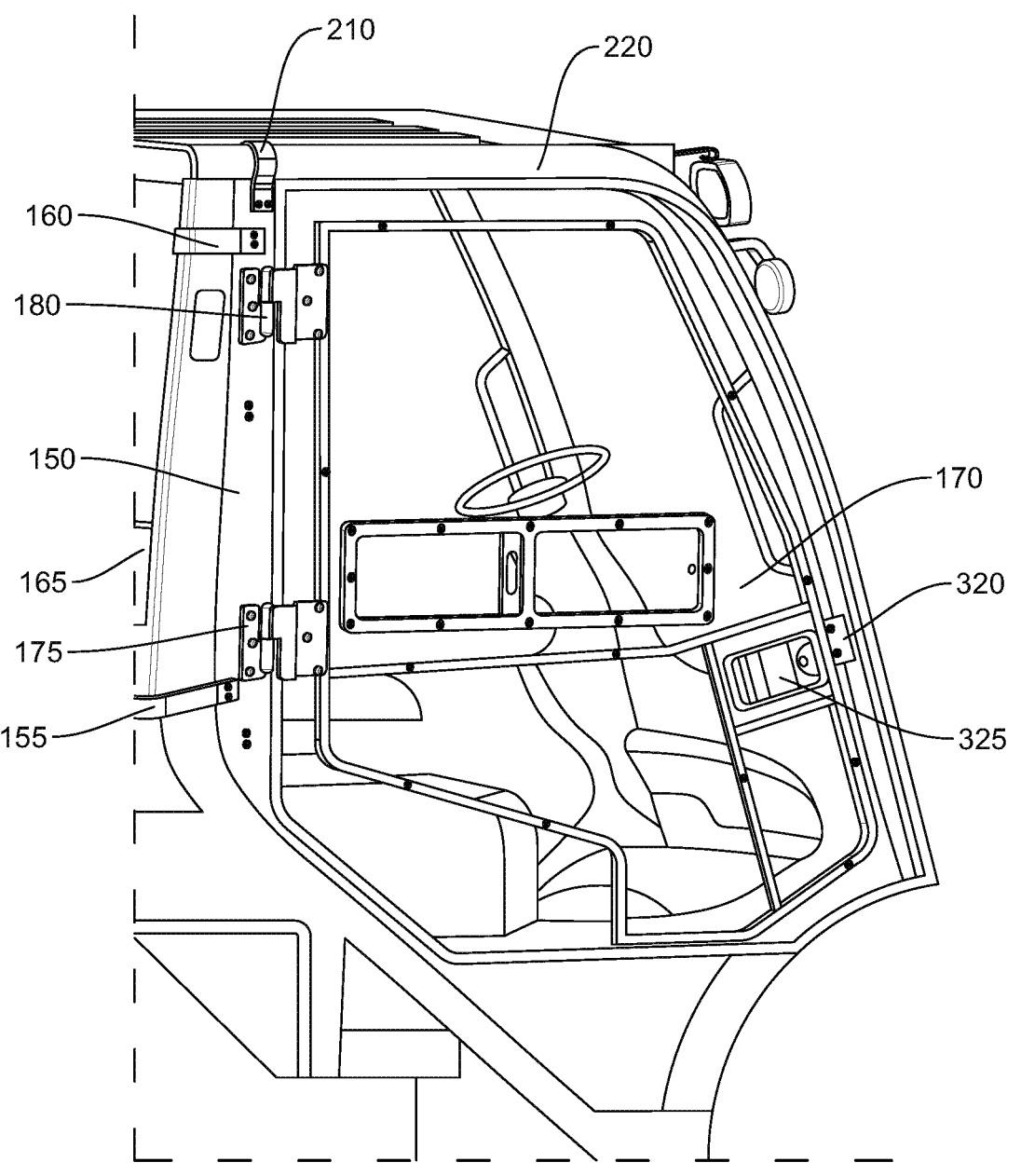
FIG. 21 is a side view of an assembled door panel attached to the vehicle.

At FIG. 21, the door panel 170 is attached to the mounting post 150 via hinges 175, 180. In some embodiments, the entirety of door panel 170 is configured to rotate relative to hinges 175, 180 to alter the configuration of the door from a closed position to an open position, or vice versa. As shown, in this embodiment, a portion of the door panel 170 is configured to rotate relative to hinges 175, 180. Further, handle 325 is latched to handle bracket 320 securing the door portion of door panel 170 in a closed position. In some embodiments, the handle 320 may include a locking mechanism to prevent unauthorized users from entering the cab of vehicle 105.

Figure 22:
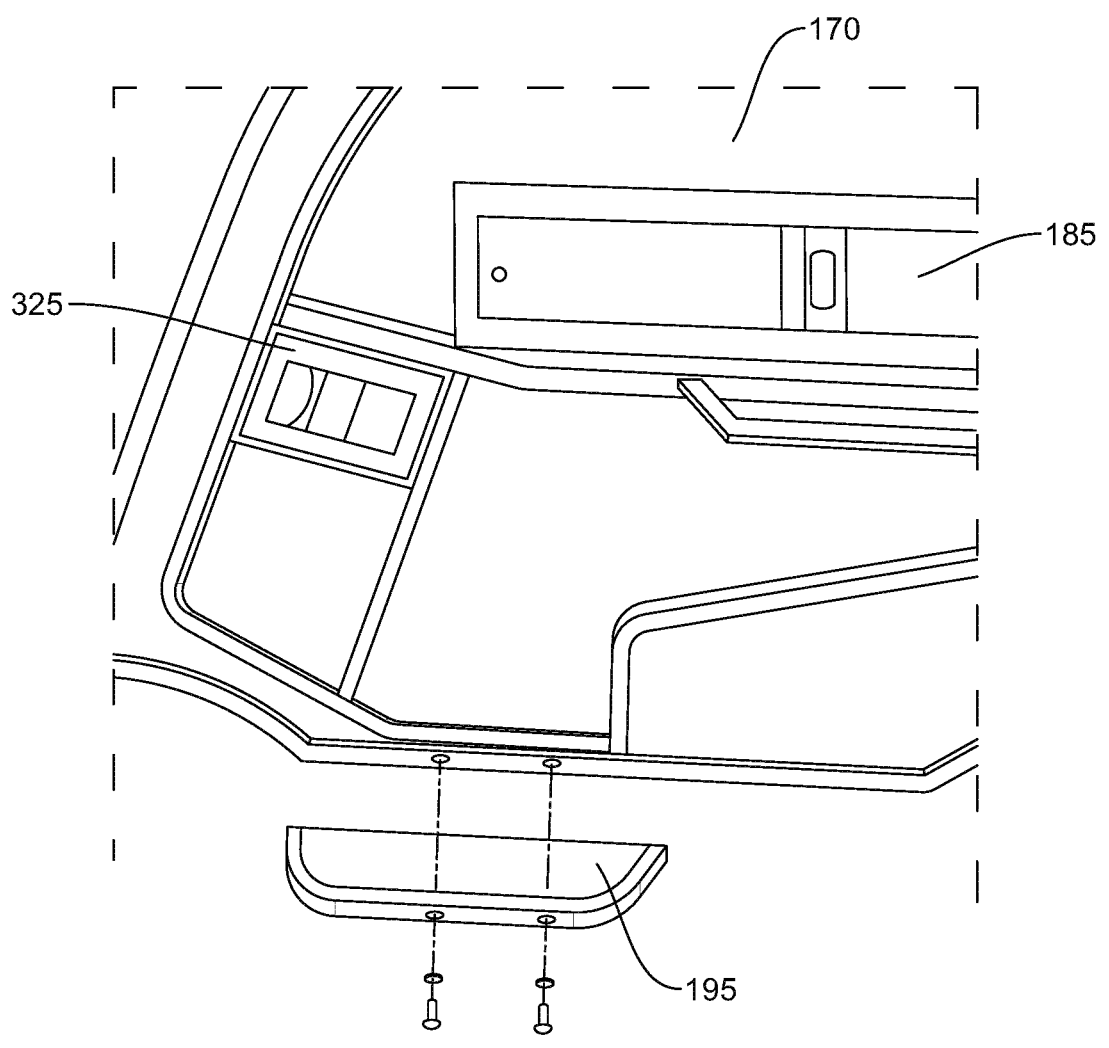
FIG. 22 is an interior view of a door panel illustrating a filler panel.

Optionally, at FIG. 22, the interior of the door panel 170 is outfitted with a filler panel 195. The filler panel 195 is configured to correspond to the shape of vehicle 105 to ensure that the cab is completely sealed from the work environment. Further, filler panel 195 may include seal 145 along its exterior. The filler panel 195 may be configured as any shape to match the contour of any vehicle 105 that enclosure system 100 is attached to. As such, the door panels 130, 170 are customizable for attachment to an assortment of vehicle shapes and types. The filler panel 195 is secured to the door panel 170 by any suitable means, such as fasteners.

Figure 23:
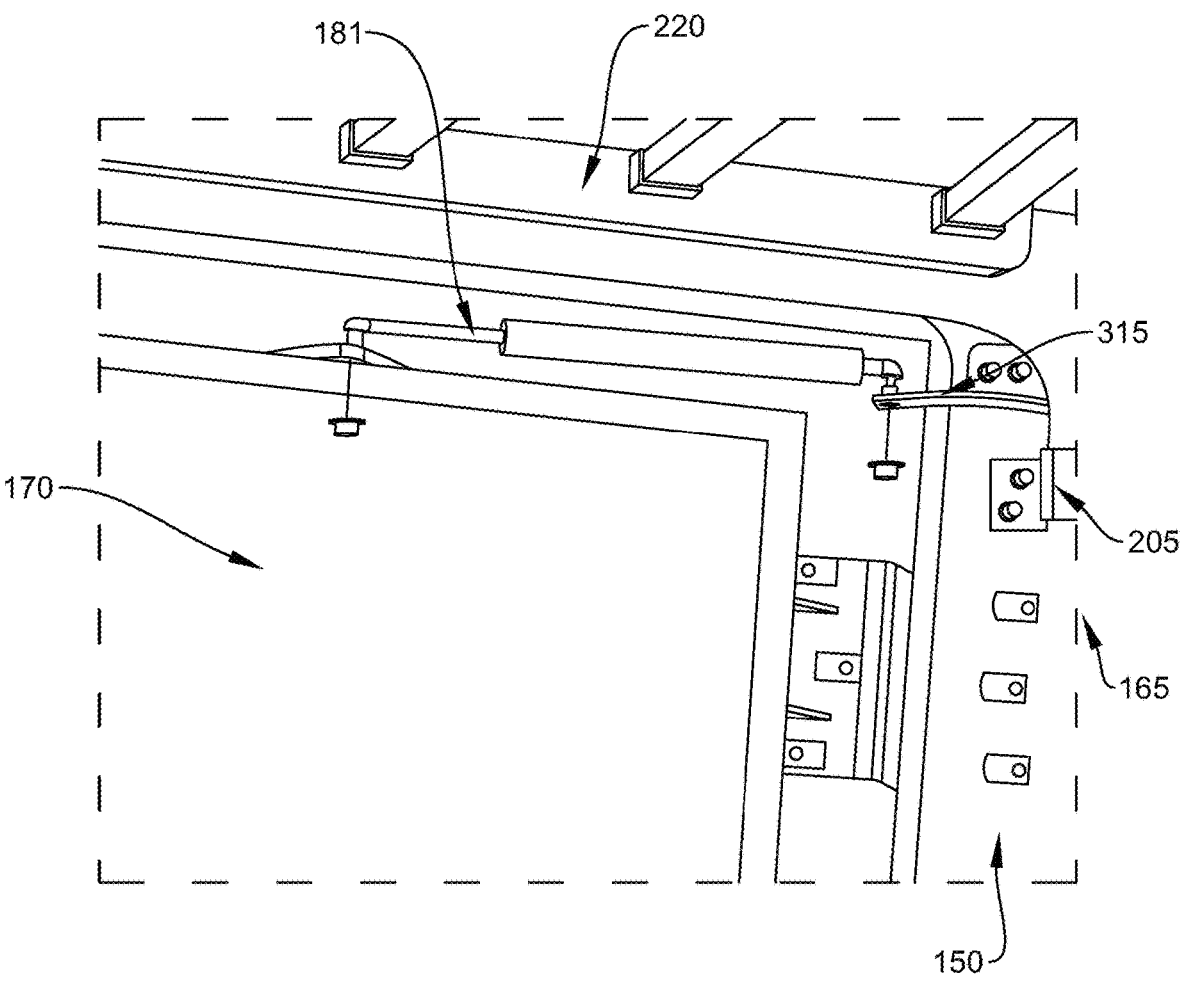
FIG. 23 is an interior view of a door panel illustrating a gas spring.

FIG. 23 depicts attachment of the gas spring 181 to the gas spring mount 315 and the door panel 170. The gas spring 181 is configured to bias the door of door panel 170 in a closed position. Alternatively or additionally, the gas spring 181 may also secure the door in an open position once gas spring 181 is fully extended and door panel 170 is fully opened. Although a gas spring 181 is illustrated, other suitable means of securing the door and either an open or closed position may be used in conjunction with the cab enclosure system 100.

Figure 24:
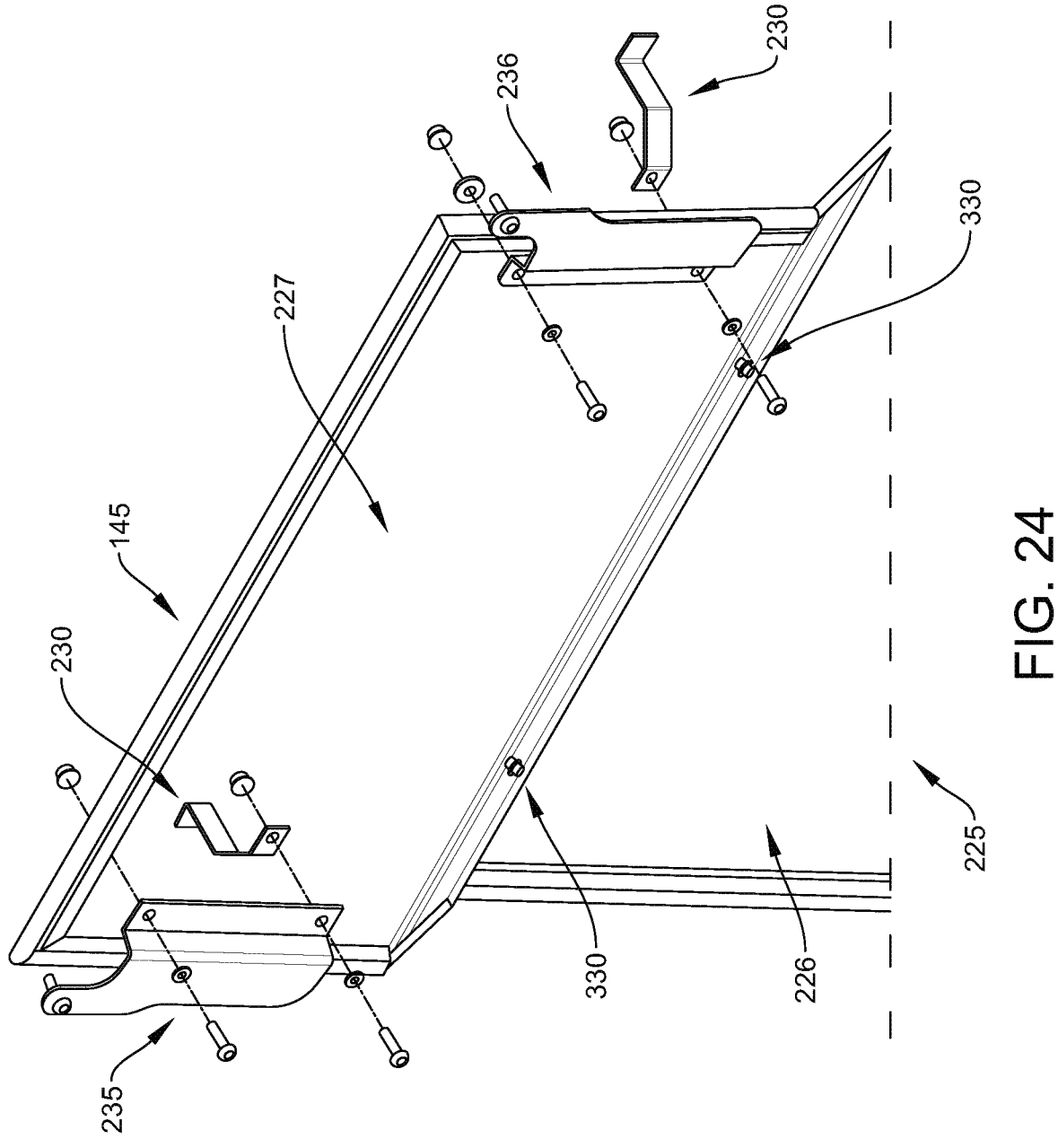
FIG. 24 is an exploded view of a rear windshield according to one embodiment.

FIG. 24 illustrates a rear windshield 225 according to one embodiment. In this embodiment, rear windshield 225 includes lower panel 226 and upper panel 227. The panels 226, 227 are secured together via mounting brackets 230. As shown, the lower and upper panels 226, 227 include tapered portions such that panel 227 is on a different vertical plane than panel 226. The shape of rear windshield 225 is configured to fit on vehicle 105, and thus, can be any suitable shape, including as depicted in FIG. 24. The rear windshield is secured to the first and second vertical posts 125, 165 of vehicle 105 via mounting brackets 230, 235, and 236. Specifically, mounting brackets 230 secure the rear windshield in one lateral direction while the brackets 235, 236 secure the rear windshield in the opposing lateral direction. In some embodiments, brackets 235, 236 may overlap with brackets 120, 160. However, this is not required, and thus, installation of rear windshield 225 is not dependent upon installation of either mounting posts 110, 150.

Attachment of rear windshield 225 to vehicle 105 is accomplished, in this embodiment, in a similar manner as attachment of door panels 130, 170. Specifically, the brackets 230 are configured to secure to two sides of vertical posts 125, 165, while brackets 235, 236 are configured to secure the rear windshield 225 to a third side of the vertical posts 125, 165. In other embodiments an additional bracket may be used attaching the rear windshield 225 to the fourth side of the vertical posts 125, 165. In some embodiments, the mounting structure defined by brackets 230, 235, 236, partially envelops the vertical mounting posts 125, 165. In other embodiments, the mounting structure for the rear windshield 225 fully envelops the vertical posts 125, 165. In any event, no one particular bracket completely envelops vertical posts 125, 165.

Figure 25:
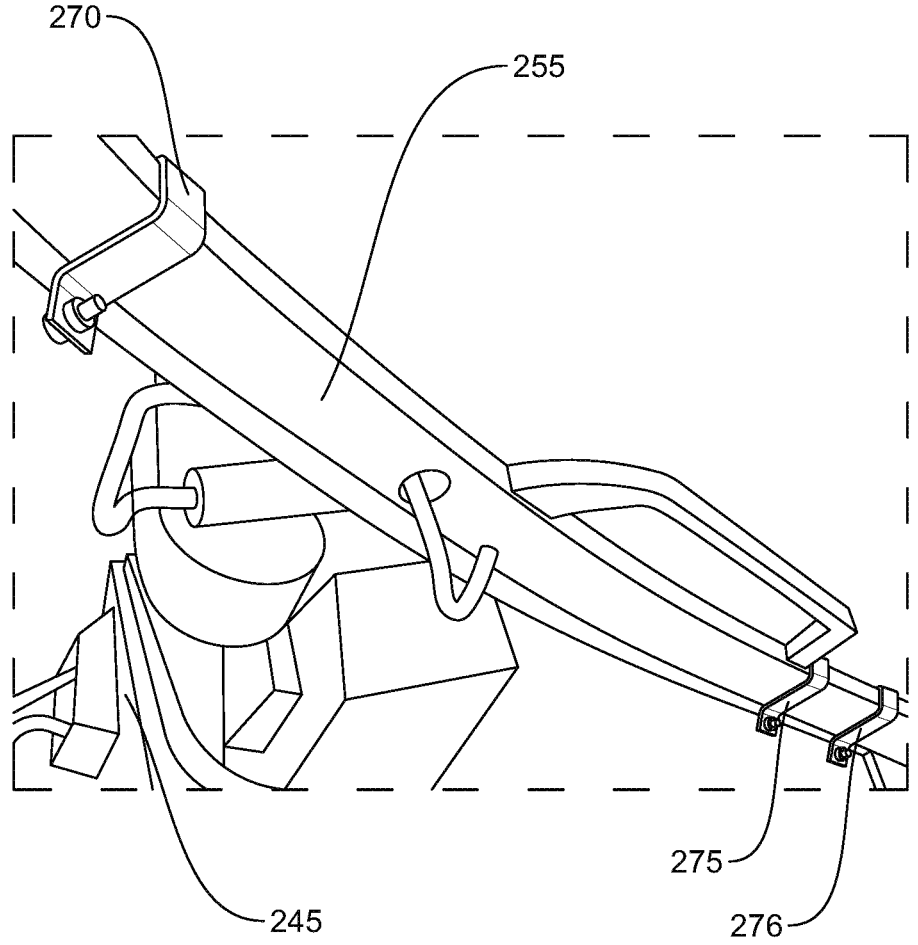
FIG. 25 depicts attachment of an embodiment of a front windshield to the vehicle.

FIG. 25 illustrates an alternative embodiment of front windshield 245. At FIG. 25, the front windshield 245 is secured to the fourth vertical post 255 via mounting brackets 270, 275, 276. As shown, bracket 276 is closer to bracket 275, as opposed to the embodiment depicted in FIG. 13, where bracket 271 is closer to bracket 270. A similar mounting arrangement may be used to secure the opposing side of front windshield 245 to the third vertical post 250 of vehicle 105.

Figure 26:
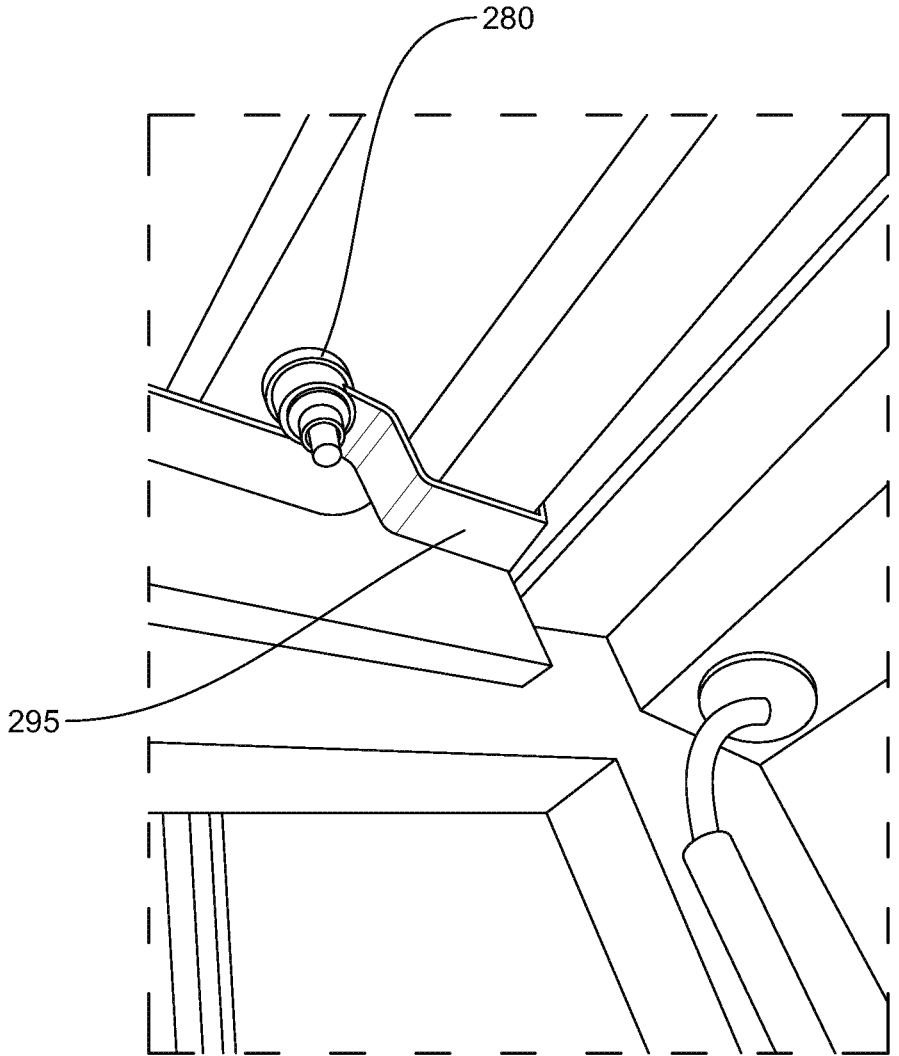
FIG. 26 is a zoomed in depiction of a mounting bracket attaching the roof panel to the vehicle.
Figure 27:
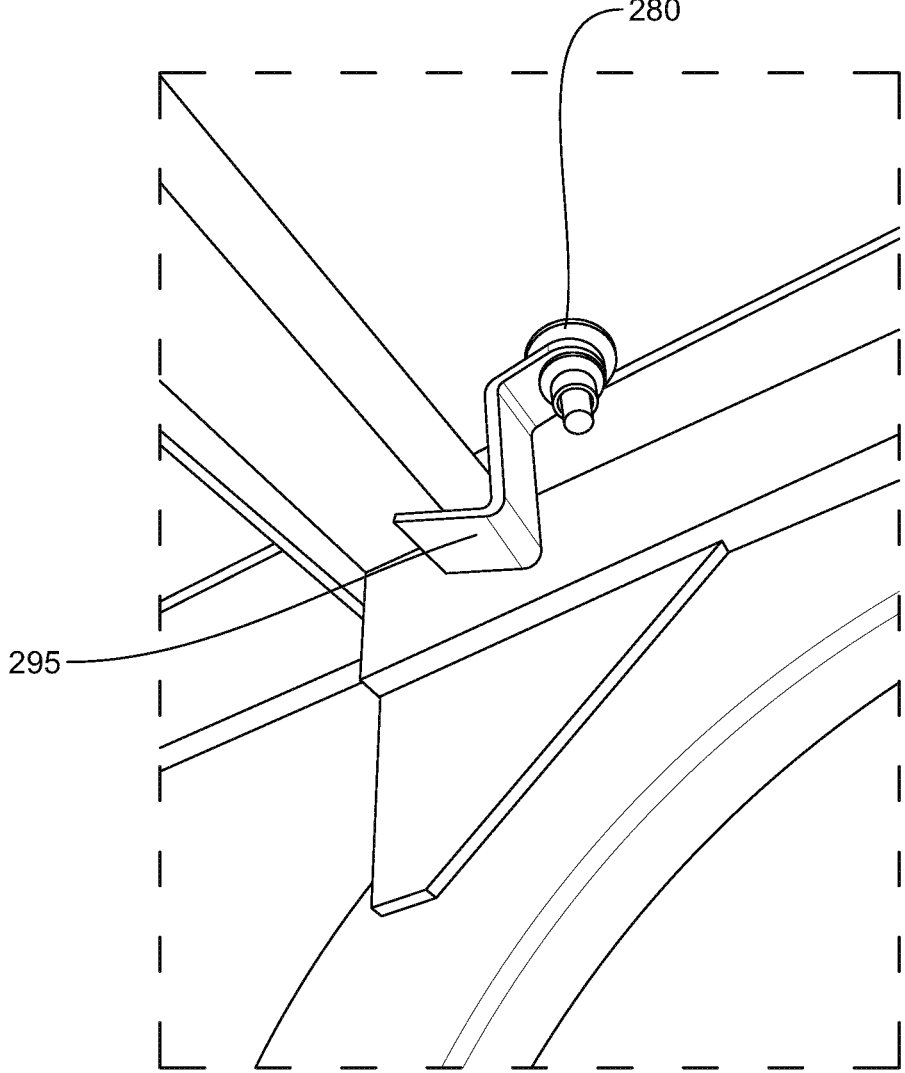
FIG. 27 is zoomed in depiction of another embodiment of a mounting bracket illustrated in FIG. 26.

At FIGS. 26 and 27, the roof panel 280 is secured to the overhead guard of the vehicle 105 via brackets 195. As shown in FIG. 27, some of the brackets 295 may be rotatable relative to its attachment to roof panel 280. This allows for this embodiment of bracket 295 to be used in the event some or all of roof panel 280 is rotatable (i.e., a portion or all of roof panel 280 can be configured in an open position, exposing the cab of vehicle 105 to the work environment). As mentioned previously, although discussed in a particular order, one or all of the panels of cab enclosure system 100 can be attached to vehicle 105 independently, without the need for component pieces or attachment pieces of any other panel. This allows vehicle 105 to be outfitted with only the portions of cab enclosure system 100 that are required for a particular working environment.

Figure 28:
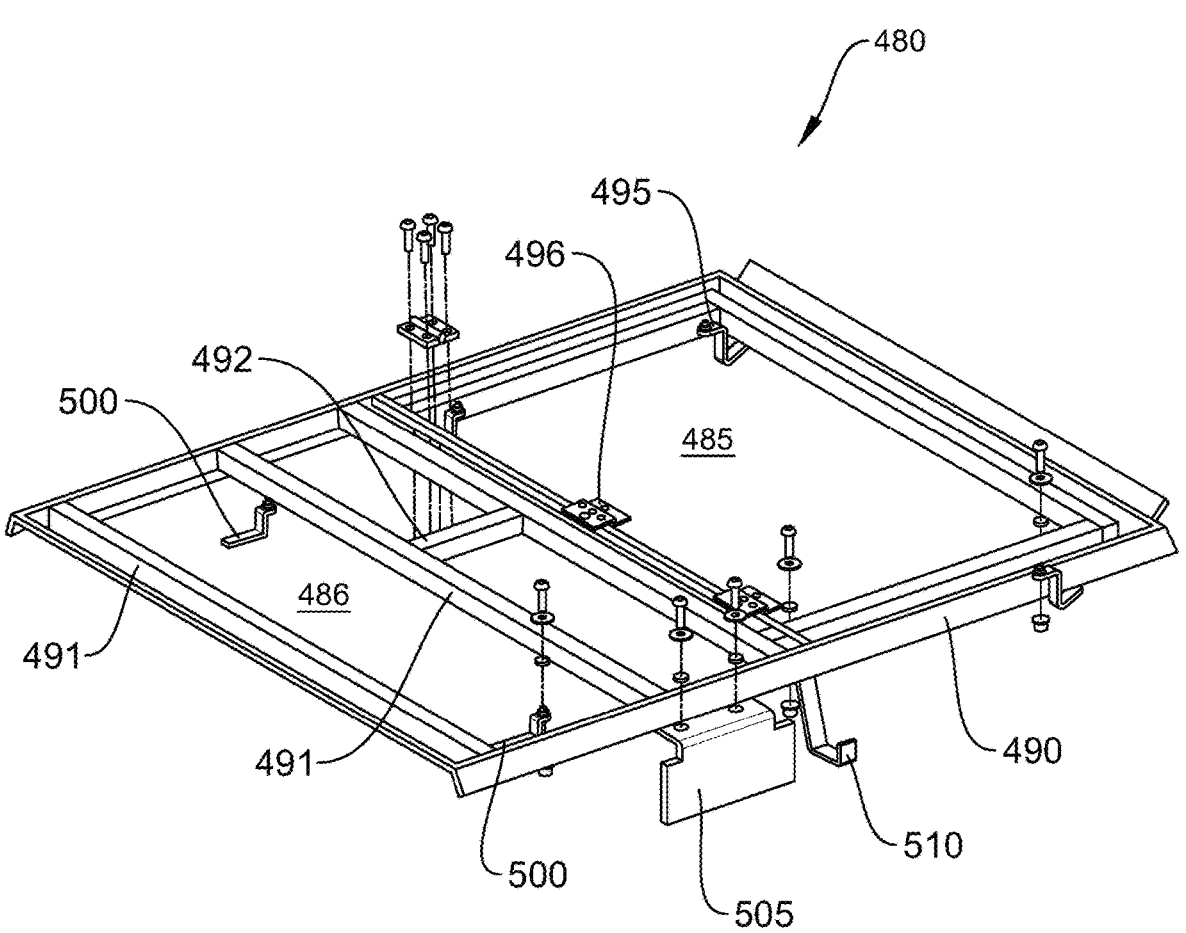
FIG. 28 is a top perspective view of an alternative embodiment of a roof panel in a closed configuration according to the present disclosure.

FIG. 28 illustrates a top perspective view of an alternative embodiment of a roof panel assembly 480. The roof panel assembly 480 includes multiple panel sections 485, 486 and frame 490. The panels 485, 486 are secured to frame 490. Roof panel assembly 480 is configured to be coupled to the overhead guard of the vehicle 105. The frame 490 comprises a plurality of slats 491, 492. The slats 491 and 492 are perpendicular relative to one another. The slats define a plurality of attachment points for securing the panel sections 485, 486 thereto.

The roof panel assembly 480 includes a number of bracket attachments. Brackets 495 attach the portion of panel 485 furthest from panel 486 to frame 490. The panel 485 is attached to the panel 486 and frame 490 via a plurality of hinges 496. As illustrated, three hinges 496 hingably attach panel 485. In other embodiments, more or less hinges 496 may be used. The brackets 500 selectively secure the panel 486 to frame 490. Brackets 500 are selectively rotatable to secure or release panel 486 from frame 490. The bracket 510 secures the roof panel assembly 480 to one of the first or second horizontal posts 215, 220. The bracket/lateral guard 505 engages with portions of the of the overhead guard to cover portions of gap 515 that would otherwise be open.

Figure 30:
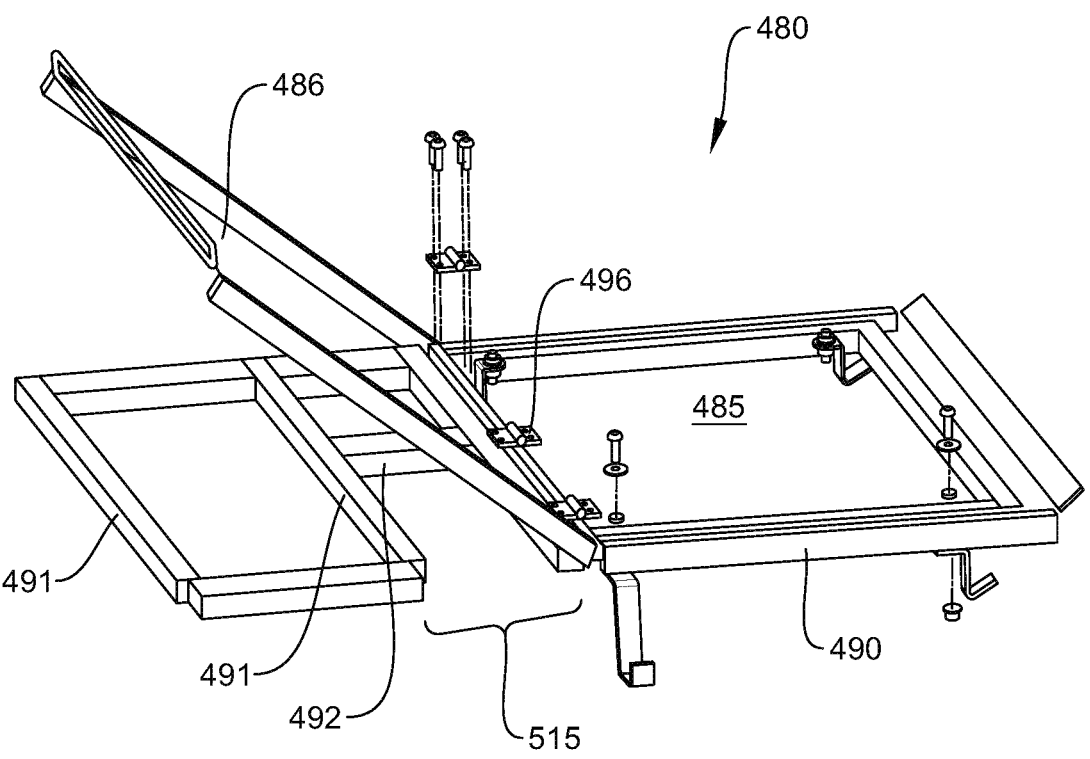
FIG. 30 is a top perspective view of the FIG. 28 roof panel.

The panel 486 of roof panel assembly 480 is configured to be rotatable relative to the frame 490. As previously mentioned, the brackets 500 that secure one end of the panel 486 to the frame 490 are selectively rotatable and engageable with the frame 490 thus defining locked and unlocked positions. In the unlocked position, the panel 486 can be rotated about hinged 496 defining an open configuration. As seen in FIG. 30, the panel 486 rotates, thus exposing gap 515 and the area below gap 515 inside the vehicle to the outside environment.

Figure 29:
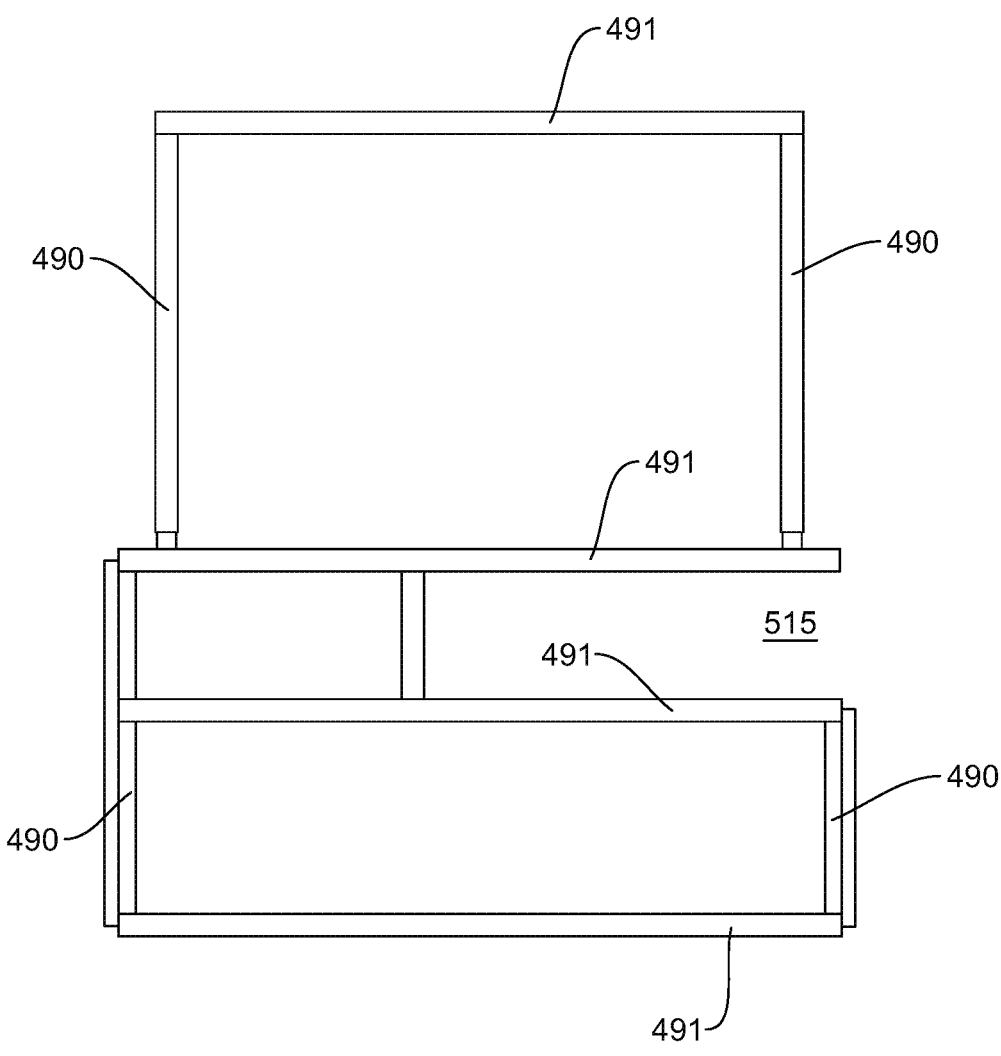
FIG. 29 is a top perspective view of the roof panel of FIG. 28 in an open configuration.

FIG. 29 illustrates frame 490 and slats 491 and 492. Slats 491 and 492 define gap 515. As discussed below, panel 486 can be selectively pivoted to expose gap 515 to permit access through roof panel assembly 480 without removing roof panel assembly 480 from the overhead guard of the vehicle.

FIG. 30 illustrates a top perspective view of roof panel assembly 480 with panel 486 rotated about hinges 496. Panel 486 is able to rotate approximately 180 degrees to lay flush, or nearly flush, with panel 485. Allowing panel 486 to rotate in this manner provides access to gap 515 located in frame 490. The gap 515 in frame 490 of roof panel assembly 480 can provides vertical access to the battery of vehicle 105, via, for example, a gentry crane. This allows for ease of access to either repair or replace the battery of vehicle 105 without the need of removing or disassembling part or all of the cab enclosure system 110.

As illustrated in FIG. 30, panel 485 and panel 486 may optionally include tapered edges to cover the edges of frame 490. The tapered edges in some embodiments taper upwards. In other embodiments, the tapered edges taper downward. In other embodiments, panel 485 and/or 486 includes non-tapered edges that are flush with frame 490. Further, any combination of tapered and/or non-tapered edges may be used.

While the invention has been described in detail in the foregoing description, the same is to be considered as illustrative and not restrictive in character, it being understood that all changes and modifications that come within the spirit of the invention are desired to be protected. In addition, all references cited herein are indicative of the level of skill in the art and are hereby incorporated by reference in their entirety.

What is claimed:

1. An enclosure for a land vehicle with an overhead guard that includes a first, second, third and fourth vertical post and a first and second horizontal post, the enclosure comprising:

a first mounting post adapted to couple to the first vertical post of the overhead guard with a first clamp that clamps against a first side of the first vertical post and clamps against a first side of the first vertical post and a second clamp that clamps against a second side of the first vertical post, opposite the first side;

a first door panel adapted to mount on the first mounting post, wherein the first door panel comprises an outer frame that defines a first opening, a first door hingably mounted on the first door panel, and a third clamp that clamps the outer frame to the fourth vertical post, wherein the first door is adapted to move between a closed position and an opened position and wherein, in the closed position, the first door covers the first opening;

a front windshield assembly comprising a front windshield, a fourth clamp that clamps the front windshield assembly to the fourth vertical post and a fifth clamp that clamps the front windshield assembly to the third vertical post;

wherein the front windshield assembly does not share any attachment points with the first door panel and is not coupled to the first door panel; and wherein the first door panel and the front windshield assembly are adapted to be coupled to the overhead guard without modifying the overhead guard.

2. The enclosure of claim 1, further comprising:

a second mounting post adapted to couple to the second vertical post of the overhead guard with a sixth clamp that clamps against a first side of the second vertical post and a seventh clamp that clamps against a second side of the first vertical post, opposite the first side, wherein the first and second sides are oriented in opposite directions;

a second door panel adapted to mount the second mounting post, wherein the second door panel comprises a second outer frame that defines a second opening a second door hingably mounted on the second door panel, and an eighth clamp that clamps the outer frame to the third vertical post, wherein the second door is adapted to move between a closed position and an opened position and wherein, in the closed position, the second door covers the second opening;

wherein the front windshield assembly does not share any attachment points with the second door panel and is not coupled to the second door panel; and wherein the second door panel is adapted to be coupled to the overhead guard without modifying the overhead guard.

3. The enclosure of claim 2, further comprising:

a rear windshield assembly comprising a rear windshield, a ninth clamp that clamps the rear windshield assembly to the first vertical post and a tenth clamp that clamps the rear windshield assembly to the second vertical post;

wherein the rear windshield assembly does not share any attachment points with the first or second mounting posts and is not coupled to either the first or second mounting posts; and wherein the rear windshield assembly is adapted to be coupled to the overhead guard without modifying the overhead guard.

4. The enclosure of claim 3, further comprising:

a roof panel assembly comprising a roof panel, an eleventh camp that clamps the roof panel to the first horizontal post and a twelfth clamp that clamps the roof panel to the second horizontal post;

wherein the roof panel assembly does not share any attachment points with the first or second mounting posts, the first or second door panels, the front windshield assembly or the rear windshield assembly; and wherein the roof panel assembly is adapted to be coupled to the overhead guard without modifying the overhead guard.

5. The enclosure of claim 4, wherein the first mounting post and the first door panel are adapted to be removed from the overhead guard without removing any of the front windshield, rear windshield and roof panel assembly.

6. The enclosure of claim 4, wherein the rear windshield is adapted to be removed from the overhead guard without removing any of the first mounting post, second mounting post and roof panel assembly.

7. The enclosure of claim 4, wherein the front windshield is adapted to be removed from the overhead guard without removing any of the first door panel, second door panel and roof panel assembly.

8. The enclosure of claim 4, wherein the roof panel assembly is adapted to be removed from the overhead guard without removing any of the first door panel, second door panel, front windshield and rear windshield.

9. The enclosure of claim 4, further comprising seals along the respective perimeters of the first door panel, the rear windshield, the second door panel, the front windshield and the roof panel.

10. The enclosure of claim 4, wherein none of the clamps are positioned on a front surface of the fourth vertical post.

11. The enclosure of claim 4, wherein none of the individual clamps completely envelops any of the vertical posts.

12. The enclosure of claim 4, wherein the first door panel, the second door panel and the roof panel are translucent.

13. The enclosure of claim 4, wherein the roof panel assembly further comprises a movable roof panel that is selectively movable relative to the roof panel to provide access to the overhead guard through the roof panel assembly.

14. The enclosure of claim 13, wherein the roof panel assembly further comprises a frame assembly positioned between the roof panel assembly and the overhead guard, wherein the frame assembly defines a gap that is selectively covered by the movable roof panel, wherein the gap extend to and through an edge of the roof panel assembly.

15. The enclosure of claim 3, wherein the first clamp and the ninth clamp are stacked vertically along the first vertical post without contacting one another.

16. The enclosure of claim 15, wherein the sixth clamp and the tenth clamp are stacked vertically along the first vertical post without contacting one another.

17. The enclosure of claim 1, wherein the first door panel further comprises a window movable relative to the door panel.

18. The enclosure of claim 1, wherein the first door panel further comprises a gas spring adapted to hold the door in the open position.

19. The enclosure of claim 1, wherein the first door is adapted to be removed from and attached to the first door panel while the first door panel is mounted on the first mounting post and is clamped to the fourth vertical post.

* * * * *